(12) United States Patent
Takano et al.

(10) Patent No.: US 12,271,104 B2
(45) Date of Patent: Apr. 8, 2025

(54) LIGHT-SOURCE DEVICE, IMAGE PROJECTION APPARATUS, AND DISPLAY DEVICE

(71) Applicants: Yohei Takano, Kanagawa (JP); Makoto Hirakawa, Tokyo (JP); Kazuhiro Fujita, Tokyo (JP); Takashi Sasaki, Kanagawa (JP)

(72) Inventors: Yohei Takano, Kanagawa (JP); Makoto Hirakawa, Tokyo (JP); Kazuhiro Fujita, Tokyo (JP); Takashi Sasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 273 days.

(21) Appl. No.: 17/946,058

(22) Filed: Sep. 16, 2022

(65) Prior Publication Data

US 2023/0110183 A1  Apr. 13, 2023

(30) Foreign Application Priority Data

Sep. 30, 2021 (JP) .................................. 2021-162136
Sep. 30, 2021 (JP) .................................. 2021-162354
Jul. 15, 2022 (JP) .................................. 2022-114201

(51) Int. Cl.
  *G03B 21/20* (2006.01)
  *G02B 26/00* (2006.01)

(52) U.S. Cl.
  CPC ......... *G03B 21/204* (2013.01); *G02B 26/008* (2013.01); *G03B 21/2066* (2013.01); *G03B 21/208* (2013.01)

(58) Field of Classification Search
  None
  See application file for complete search history.

(56) References Cited

U.S. PATENT DOCUMENTS

2005/0180007 A1* 8/2005 Cossairt ............... G03B 21/562
                                                    359/465
2017/0307969 A1* 10/2017 Kawasumi ......... G03B 21/2073
(Continued)

FOREIGN PATENT DOCUMENTS

JP  2003-186154    7/2003
JP  2011-095291    5/2011
(Continued)

OTHER PUBLICATIONS

U.S. Appl. No. 17/692,208, filed Mar. 11, 2022, Kasumi Nakamura, et al.

*Primary Examiner* — Bao-Luan Q Le
*Assistant Examiner* — Danell L Owens
(74) *Attorney, Agent, or Firm* — XSENSUS LLP

(57) ABSTRACT

A light-source device, an image projection apparatus, and a display device. The light-source device includes a light source to emit light, an optical element having a lens array on one side or both sides of which a plurality of lenses are arrayed with distance from each other, the distance between a pair of vertices of an adjacent pair of the plurality of lenses of the optical element being equal to or less than one-quarter of width of light flux of the light incident on the optical element, and a wavelength conversion element to convert a wavelength of the light emitted from the light source and passed through the optical element. An image projection apparatus includes the light-source device, a light mixing element to mix the light emitted from the light-source device to uniformize the light, and an illumination optical system to emit the light uniformized by the light mixing element.

19 Claims, 27 Drawing Sheets

(56) References Cited

U.S. PATENT DOCUMENTS

| | | |
|---|---|---|
| 2019/0170988 A1 | 6/2019 | Takano et al. |
| 2019/0219801 A1 | 7/2019 | Takano et al. |
| 2020/0064719 A1 | 2/2020 | Nakamura et al. |
| 2020/0201008 A1 | 6/2020 | Takano et al. |
| 2020/0230886 A1 | 7/2020 | Takano et al. |
| 2020/0301260 A1 | 9/2020 | Takano et al. |
| 2020/0301266 A1 | 9/2020 | Nakamura et al. |
| 2021/0136336 A1 | 5/2021 | Takano et al. |
| 2021/0173290 A1 | 6/2021 | Takano et al. |
| 2021/0200075 A1 | 7/2021 | Nakamura et al. |
| 2021/0389652 A1 | 12/2021 | Takano et al. |
| 2022/0066177 A1 | 3/2022 | Takano et al. |
| 2022/0171267 A1 | 6/2022 | Takano et al. |
| 2022/0171268 A1 | 6/2022 | Hirakawa et al. |
| 2022/0179298 A1 | 6/2022 | Fujita et al. |

FOREIGN PATENT DOCUMENTS

| | | |
|---|---|---|
| JP | 2013-092788 | 5/2013 |
| JP | 2017-097310 | 6/2017 |
| JP | 2019-140117 | 8/2019 |
| JP | 2020-086261 | 6/2020 |

\* cited by examiner

|  | X-DIRECTION | Y-DIRECTION |
|---|---|---|
| D | 7mm | 4mm |
| Dsingle | 1.5mm | 2.5mm |
| P | 0.2mm | 0.3mm |
| Dopt | 24mm | 24mm |
| Dmirror | 4mm | 7.5mm |

|  | X-DIRECTION | Y-DIRECTION |
|---|---|---|
| D | 7mm | 4mm |
| Dsingle | 1.5mm | 2.5mm |
| P | 0.7mm | 1.0mm |
| Dopt | 24mm | 24mm |
| Dmirror | 4mm | 7.5mm |

|  | X-DIRECTION | Y-DIRECTION |
|---|---|---|
| D | 6mm | 4mm |
| Dsingle | 1.5mm | 2.5mm |
| P | 1.8mm | 2.4mm |
| Dopt | 24mm | 24mm |
| Dmirror | 4mm | 7.5mm |

BEFORE ADJUSTMENT

AFTER ADJUSTMENT

LIGHT-SOURCE DEVICE, IMAGE PROJECTION APPARATUS, AND DISPLAY DEVICE

CROSS-REFERENCE TO RELATED APPLICATIONS

This patent application is based on and claims priority pursuant to 35 U.S.C. § 119 (a) to Japanese Patent Application Nos. 2021-162354, 2021-162136, and 2022-114201, filed on Sep. 30, 2021, Sep. 30, 2021, and Jul. 15, 2022, respectively, in the Japan Patent Office, the entire disclosures of which are hereby incorporated by reference herein.

BACKGROUND

Technical Field

Embodiments of the present disclosure relate to a light-source device, an image projection apparatus, and a display device.

Background Art

Currently, projectors or image projection apparatuses that magnify and project various kinds of images or moving images are widespread. Projectors focus the light emitted from a light source onto a spatial-light modulation element or an image display element such as a digital micromirror device (DMD) or a liquid crystal display, and display, as a color image, the light reflected and emitted from the spatial-light modulation element, which is modulated based on a video signal, onto a screen.

SUMMARY

Embodiments of the present disclosure described herein provide a light-source device, an image projection apparatus, and a display device. The light-source device includes a light source to emit light, an optical element having a lens array on one side or both sides of which a plurality of lenses are arrayed with distance from each other, the distance between a pair of vertices of an adjacent pair of the plurality of lenses of the optical element being equal to or less than one-quarter of width of light flux of the light incident on the optical element, and a wavelength conversion element to convert a wavelength of the light emitted from the light source and passed through the optical element. An image projection apparatus includes the light-source device, a light mixing element to mix the light emitted from the light-source device to uniformize the light, an illumination optical system to emit the light uniformized by the light mixing element, an image forming element to modulate the light emitted from the illumination optical system to form an image of image light, and a projection optical system to project the image light formed by the image forming element to a to-be-irradiated member. The display device includes the image projection apparatus and a to-be-irradiated member irradiated with the image light from the image projection apparatus. In the display device, the to-be-irradiated member irradiated with the image light is rotated or vibrated to display a three-dimensional image.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
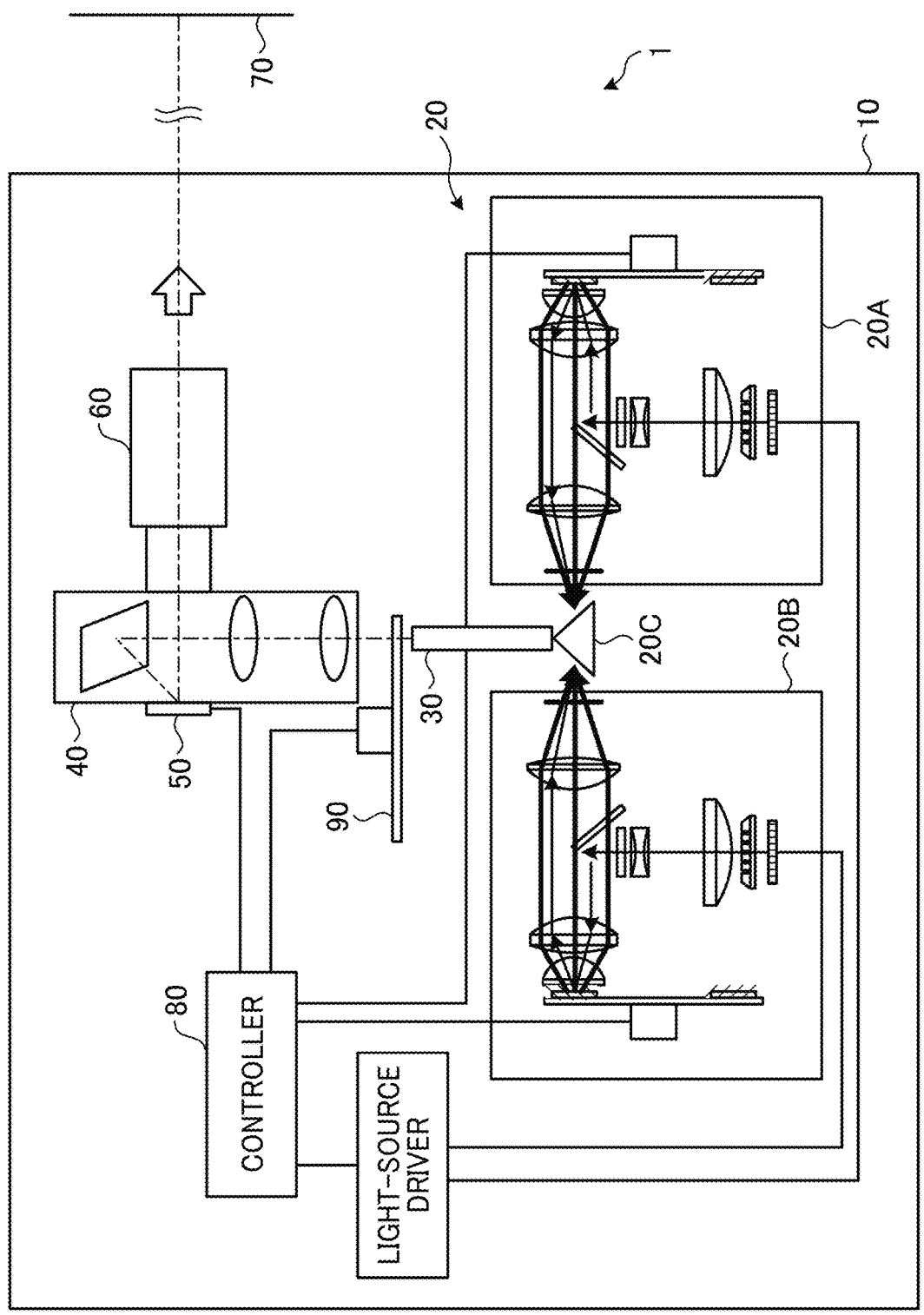
FIG. 1 is a schematic diagram illustrating a projector according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

A light-source device 20, a projector 1 that serves as an image projection apparatus, and a display device 100 according to an embodiment of the present disclosure are described below in detail with reference to the accompanying drawings.

First Embodiment

FIG. 1 is a schematic diagram illustrating a projector 1 according to a first embodiment of the present disclosure.

The projector 1 according to the present embodiment that serves as an image projection apparatus includes a housing 10, a light-source device 20, a light mixing element 30, an illumination optical system 40, an image forming element 50 that serves as an image display element, a projection optical system 60, a controller 80, and a color wheel 90.

The housing 10 according to the present embodiment accommodates the light-source device 20, the light mixing element 30, the illumination optical system 40, the image forming element 50, the projection optical system 60, the controller 80, and the color wheel 90.

The light-source device 20 emits, for example, the light including the wavelength corresponding to each color of red, green, and blue (RGB). The light-source device 20 according to the present embodiment includes a light source unit 20A, a light source unit 20B, and an optical-path combiner 20C that serves as a combining unit. The light source units 20A and 20B have the same structure and emit the light flux of light beams having a predetermined shape. The inner structure of the light source unit 20A and the light source unit 20B will be described later in detail. The light flux that is emitted from each of the light source unit 20A and the light source unit 20B is deflected by optical-path combiner 20C, and is incident on the face of the light mixing element 30 on the light entering side. In the present embodiment, a prism is adopted as the optical-path combiner 20C. However, no limitation is indicated thereby.

As illustrated in FIG. 1, in the projector 1 according to the present embodiment, each one of the two bundles of laser beams that are being concentrated, which are output from the light source unit 20A and the light source unit 20B facing each other, are reflected and deflected by the two reflectors having an angle of approximately 90 degrees with each other, and are reflected into the same direction. In FIG. 1, the optical-path combiner 20C serves as the above two reflectors. Then, these two bundles of laser beams are combined together upon making those bundles of laser beams adjacent to each other or partially overlapped one another, and are incident on the light mixing element 30 at the same time.

The light-source device 20 according to the present embodiment includes a pair of light source units 20A and 20B. However, no limitation is indicated thereby, and two or more light source units may be used to combine bundles of laser beams. For example, four light source units may be used to combine bundles of laser beams.

The light mixing element 30 mixes the light emitted from the light-source device 20. As a result, equalization of the light is achieved. More specifically, the light mixing element 30 makes the bundle of laser beams incident on the light entering side propagate internally with repeated reflection, and makes the bundle of laser beams exit from the light-emitting surface. The light mixing element 30 internally reflects the bundle of laser beams incident on the light entering side a plurality of times. As a result, the light is evenly formed on the exit plane. As the light mixing element 30, for example, a light tunnel in which the inside is hollow and four mirrors are combined on the inner surface, a rod integrator in which a prism is formed of a transparent material such as glass, a fly-eye lens, or the like is used. For example, when a light tunnel is applied as the light mixing element 30, the aspect ratio of the image forming element 50 is made substantially equivalent to the aspect ratio of the light mixing element 30, and the shape of the exit of the light tunnel is projected onto a face of the image forming element 50. As a result, the light can be projected onto the face of the image forming element 50 with little loss.

The illumination optical system 40 approximately evenly irradiates the image forming element 50 with the light uniformized by the light mixing element 30. The illumination optical system 40 includes, for example, one or more lenses and one or more reflection surfaces.

For example, the image forming element 50 includes a light valve such as a digital micromirror device (DMD), a transmissive liquid crystal panel, and a reflective liquid crystal pane. The image forming element 50 modulates the light emitted from the illumination optical system 40 or the light emitted from the light-source optical system of the light-source device 20 to form the image light For example, the controller 80 switches the face of the image forming element 50 on a pixel-by-pixel basis by reflecting or transmitting the illumination light emitted to the image forming element 50 in accordance with the input image, and guides the light to the projection optical system 60.

The projection optical system 60 magnifies the image light formed by the image forming element 50 and projects the magnified image light onto a screen 70 that serves as a to-be-irradiated member. The projection optical system 60 includes, for example, at least one lens. The projection optical system 60 is conjugated with the image forming element 50 such that an image on the face of the image forming element 50 is formed as a magnified image at a desired position of the screen 70 that serves as a to-be-irradiated member. Due to such a configuration, the spatially-modulated image light is magnified and projected onto the face of the image forming element 50.

At the exit of light of the light mixing element 30, a color wheel 90 that has a function to switch a plurality of color filters is arranged so as to extract, at least, a blue light component, a green light component, and a red light component. The color wheel 90 is provided with a plurality of color filters used to extract a desired color component from the fluorescent light.

The color wheel 90 synchronizes the rotation of the wavelength conversion element 26 (see, for example, FIG. 3A) used in the light source units 20A and the light source units 20B with the rotation of the color wheel 90, and switches the color filters in a synchronous manner. Moreover, the color wheel 90 displays the image on the face of the image forming element 50 according to the timing at which those color filters are switched to display the monochromatic image in sequence. As such a time for switching is shorter and faster than the response speed of the eyes, the image is recognized as a color image.

More specifically, the color wheel 90 switches the color filters in sequence. As a result, necessary color components, for example, a green component and a red component are extracted from the fluorescent light in a time-division manner. In order to sequentially switch the color filters in this manner, a segment may be provided for each color filter and rotated by the rotary motor so that a desired color filter is sequentially switched.

Figure 2:
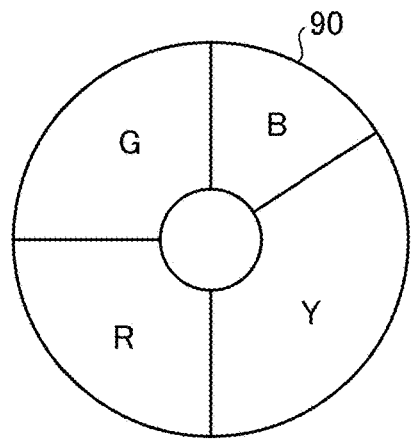
FIG. 2 is a diagram illustrating a configuration of a color wheel according to an embodiment of the present disclosure.

FIG. 2 is a diagram illustrating a configuration of the color wheel 90 according to the present embodiment.

As illustrated in FIG. 2, the color wheel 90 is divided into four areas including a blue area B, a yellow area Y, a red area R, and a green area G. Synchronization is performed such that the blue region B corresponds to the blue reflection area A3 (see FIG. 8) of the wavelength conversion element 26, and the yellow area Y, the red area R, and that the green area G correspond to the phosphor area A1 and the phosphor area A2 (see FIG. 8) of the wavelength conversion element 26.

As a transmissive diffuser panel is arranged on the blue area B, the coherence of the laser beam source can be reduced, and the speckle patterns on the screen 70 that serves as a to-be-irradiated member can be reduced. The yellow area Y transmits the light in the wavelength range of yellow emitted from the phosphor areas of the wavelength conversion element 26 on an as-is basis. Each one of the red area R and the green area G uses a dichroic mirror to reflect the light of unnecessary wavelength bands for the wavelength bands of yellow. As a result, light of color with high purity can be obtained.

The multiple colors that are generated by the color wheel 90 are guided to the image forming element 50 through the illumination optical system 40. The image forming element 50 forms an image corresponding to each color. Then, the projection optical system 60 magnifies the image formed by the image forming element 50 and projects the magnified image onto the screen 70 that serves as a to-be-irradiated member.

Figure 3A:
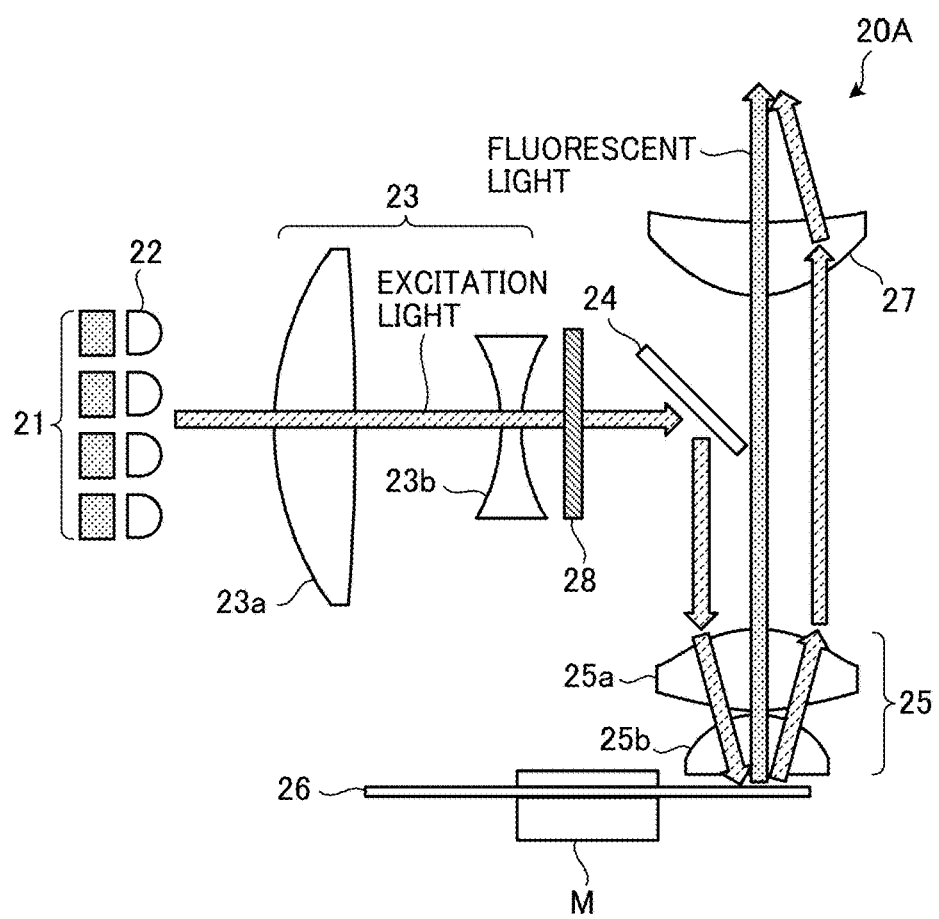
FIG. 3A is a schematic diagram illustrating a configuration or structure of a light source unit according to an embodiment of the present disclosure.

FIG. 3A is a schematic diagram illustrating a configuration or structure of the light source unit 20A according to the present embodiment.

Figure 3B:
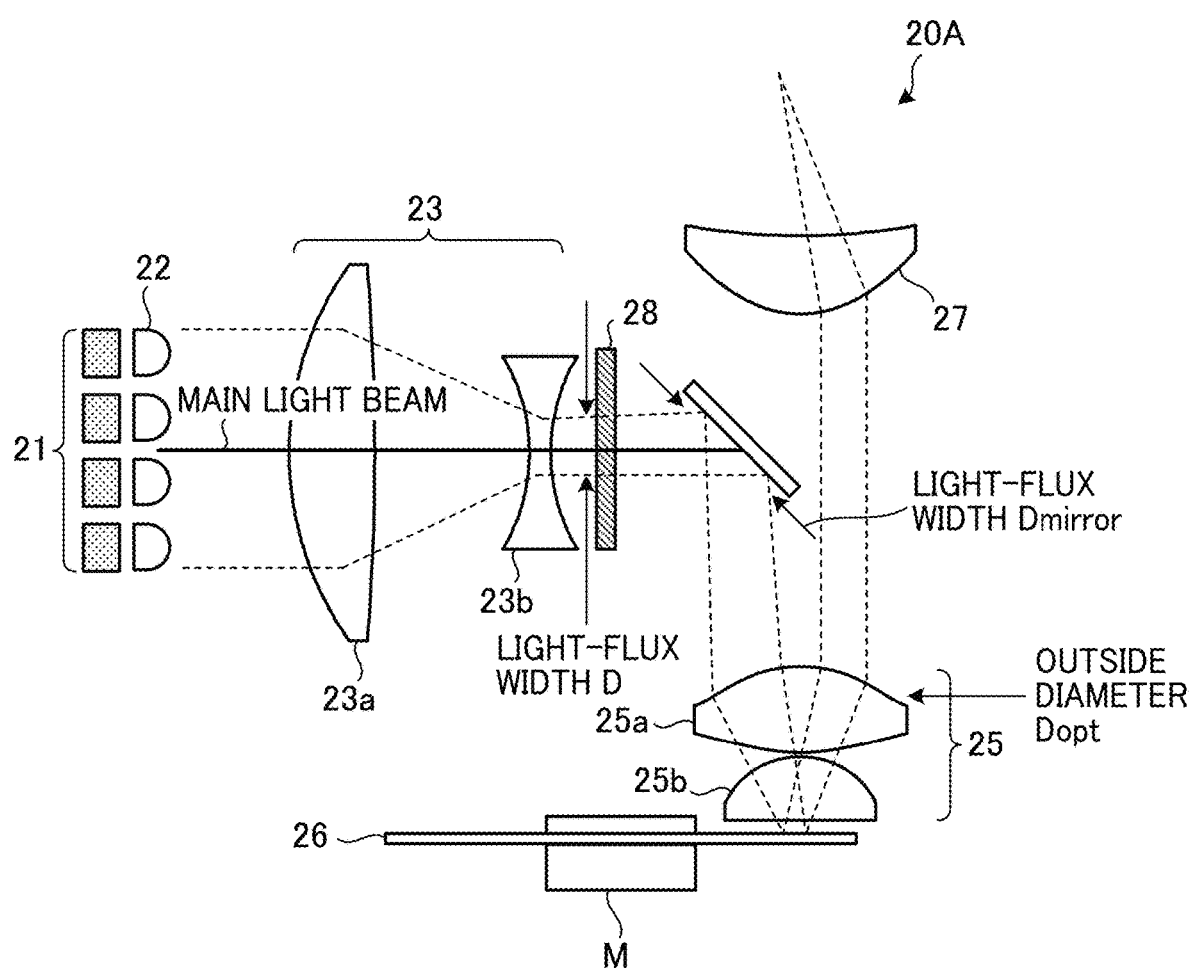
FIG. 3B is a schematic diagram illustrating light flux in a light source unit according to an embodiment of the present disclosure.

FIG. 3B is a schematic diagram illustrating the light flux in the light source unit 20A according to the present embodiment.

The light source unit 20B has a configuration and structure similar to that of the light source unit 20A.

The light source unit 20A or the light source unit 20B according to the present embodiment includes a plurality of laser beam sources 21 that serve as a plurality of excitation light sources, a plurality of collimator lenses 22 provided for the multiple light sources that make up the laser beam source 21 that serves as an excitation light source, respectively, a first optical system 23, an optical element 28, a dichroic mirror 24, a second optical system 25 that serves as a condensing optical system, a wavelength conversion element 26 that serves as a wavelength-conversion plate, and a third optical system 27, which are arranged in stages in the direction of propagation of the light. The first optical system 23 is composed of a positive lens 23a with positive optical power and a negative lens 23b with negative optical power. The second optical system 25 is composed of two lenses including a positive lens 25a and a positive lens 25b. The outer diameter of the negative lens 23b of the first optical system 23 is equal to or less than half of the outside diameter of the positive lens 25a of the second optical system 25. The outside diameter of the positive lens 25a of the second optical system 25 is referred to as $D_{opt}$ as will be described later in detail. As a result, the light flux of laser beams can be made thin, and downsizing can be achieved. For example, the light-source optical system is composed of the elements of the light-source device 20 from which the laser beam source 21 and the wavelength conversion element 26 are excluded. In the light source unit 20A or the light source unit 20B according to the present embodiment, the above-described elements are arranged in the order of the propagation of the excitation light emitted from the laser beam source 21.

The laser beam source 21 includes a plurality of light sources that serve as a plurality of light-emitting points. As the laser beam source 21, a laser diode (LD) in which a plurality of light-emitting points are two-dimensionally arrayed is used. In FIG. 3A, four light sources that are arranged in the up-and-down directions are illustrated. However, in actuality, four light sources are arranged in four rows in the depth direction orthogonal to the sheet, and sixteen (4×4) light sources are arrayed in two dimensions. The multiple light sources of the laser beam source 21 emit a blue laser beam in a wavelength band of blue, where the central wavelength in light-emission intensity is, for example, 455 nanometers (nm), as the excitation light that excites the fluorescent material provided for the wavelength conversion element 26.

For example, a metal block on which a plurality of laser diodes (LDs) are arranged or a circuit board on which a plurality of laser-diode (LD) chips are arrayed, which is referred to as a multichip circuit, may be used as the laser beam source 21. In the present embodiment, a multichip circuit is used as the light source. However, no limitation is indicated thereby, and for example, a light source in which a plurality of can laser diodes are arrayed may be adopted.

The blue laser beams that are emitted from the multiple light sources of the laser beam source 21 are linearly polarized light whose polarization state is constant, and are arranged so as to become S-polarized light when incident on the dichroic mirror 24. In the present embodiment, the laser beams are made incident so as to be S-polarized light. However, no limitation is indicated thereby, and the laser beams may be made incident so as to be P-polarized light or light in other kinds of the polarization state. The blue laser beams that are emitted from the multiple light sources of the laser beam source 21 are coherent light. The excitation light that is emitted from the multiple light sources of the laser beam source 21 is satisfactory as long as it is the light in a wavelength that can excite the phosphor provided for the wavelength conversion element 26, and is not limited to the light in a wavelength band of blue.

In the present embodiment, a plurality of light sources are used as the laser beam source 21. However, no limitation is indicated thereby, and a single laser beam source may be used as the laser beam source 21. A light source unit that is a substrate on which a plurality of light sources are arrayed may be used as the laser beam source 21 according to the present embodiment. However, no limitation is indicated thereby. As illustrated in FIG. 3B, in the present embodiment, the center line of the light flux of laser beams formed by a plurality of laser beam sources or a single laser beam source is used as the main light beam.

In response to the sixteen light source of the laser beam source 21, sixteen collimator lenses a22 are arranged in the present embodiment. The multiple collimator lenses 22 according to the present embodiment adjust and approximately collimate the excitation light emitted from the multiple light sources of the laser beam source 21. It is satisfactory as long as the number of the collimator lenses 22 correspond to the number of the light sources of the laser beam source 21, and the number of the collimator lenses 22 may be increased or decreased according to the multiple light sources of the multiple laser beam sources 21.

The optical element 28 is a microlens array having a lens-array surface in which a plurality of lenses are arranged in an array. The optical element 28 according to the present embodiment changes the profile of the laser beams. More specifically, the optical element 28 uniformizes the light density of the light spot formed on the wavelength conversion element 26, and prevents the temperature of the wavelength conversion element 26 from increasing locally. As a result, a reduction in the conversion efficiency of wavelength can be prevented. The lens-array surface of the optical element 28 may have either one of the plane on which the light that is incident or the plane from which the light exits. Alternatively, the lens-array surface of the optical element 28 may have a plurality of planes including the plane on which the light that is incident and the plane from which the light exits. The optical element 28 can achieve a low-loss image projection apparatus when it has at least two lens-array surfaces. When the optical element 28 has a lens-array surface on either one of the plane on which the light that is incident or the plane from which the light exits, an image projection apparatus can be achieved at a low cost. The optical element 28 may be a single optical element or a plurality of optical elements. The optical element 28 according to the present embodiment is a lens array in which a plurality of spherical lenses are arrayed in a rectangular shape on both front and rear sides.

The excitation light that is emitted from the multiple laser beam sources 21 is approximately collimated by the multiple collimator lenses 22 that correspond to the multiple light sources of the laser beam sources 21. Then, the approximately collimated excitation light is incident on the first optical system 23. The first optical system 23 is arranged such that the optical axis passes through the center of the array of the laser beam source 21. In other words, the main light beam matches the optical axis of the first optical system 23. The light flux of the excitation light is reduced in size by the first optical system 23, and is incident on the optical element 28 as the light flux having a light-flux width D. As described above, the light flux of laser beams can be made thin using the first optical system 23. Accordingly, the light-source optical system can be downsized. In the present embodiment, $D_{single}$ denotes the light-flux width of each one of the light source images of the excitation light on the optical element 28, where the excitation light is emitted from each one of the excitation light sources. The excitation light that has passed through the first optical system 23 then passes through the optical element 28, and is guided to the dichroic mirror 24 arranged at an angle of 45 degrees with respect to the optical axis of the first optical system 23.

In the present embodiment, the dichroic mirror 24 is arranged at an angle of 45 degrees. However, no limitation is indicated thereby, and the dichroic mirror 24 may be arranged at an angle of different degrees.

Figure 4:
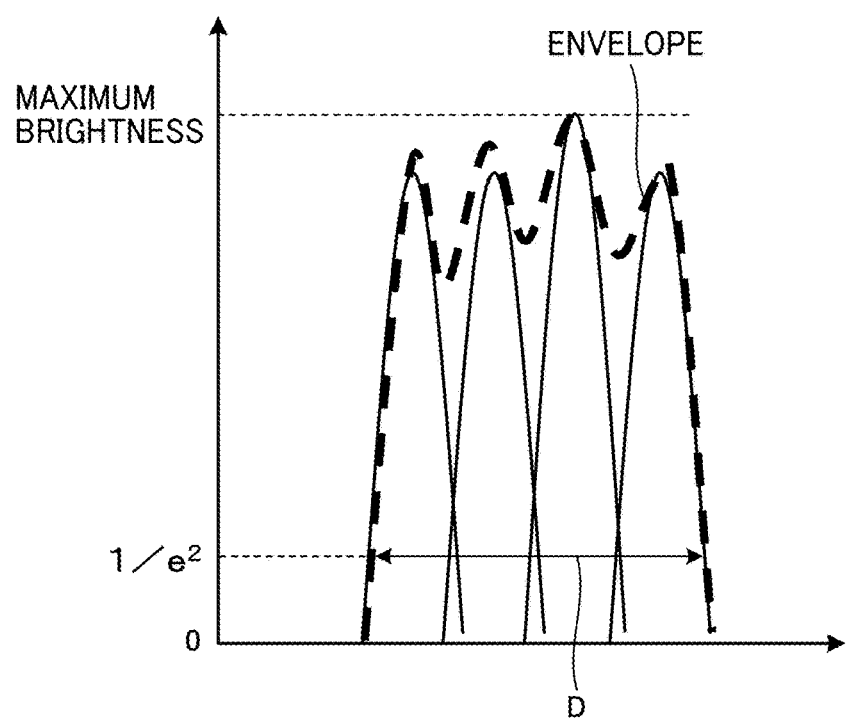
FIG. 4 is a diagram illustrating the cross section of the brightness of a light source image of the entire excitation light incident on an optical element, according to the present embodiment.

FIG. 4 is a diagram illustrating the cross section of the brightness of a light source image of the entire excitation light incident on the optical element 28, according to the present embodiment.

Figure 5:
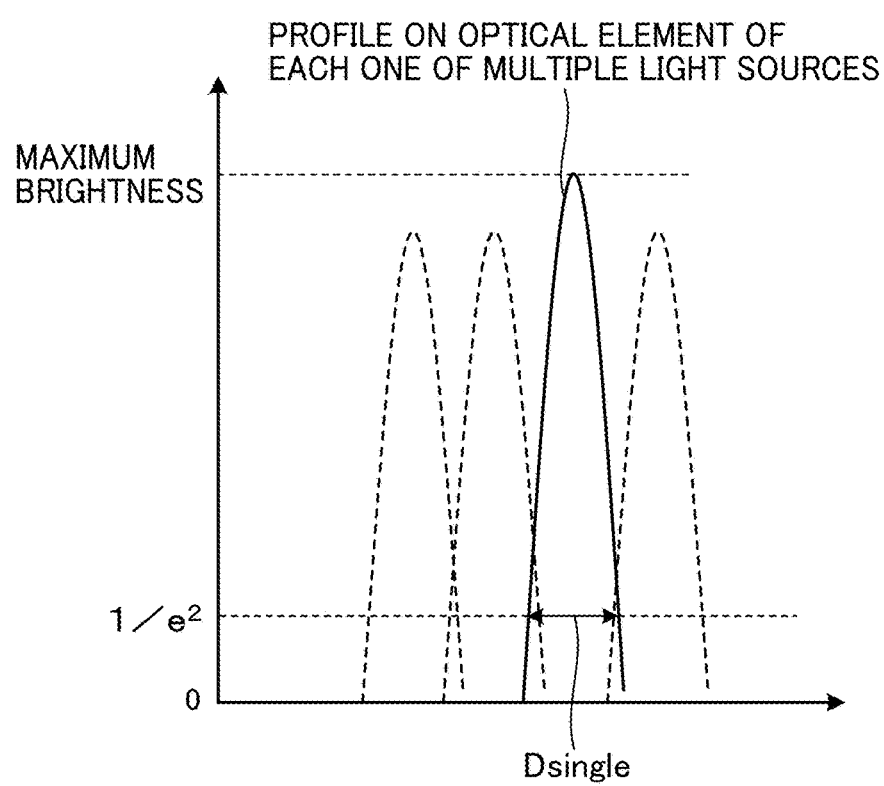
FIG. 5 is a diagram illustrating the cross section of the brightness of a light source image of a single light source on an optical element, according to an embodiment of the present disclosure.

FIG. 5 is a diagram illustrating the cross section of the brightness of a light source image of a single light source on the optical element 28, according to the present embodiment.

In the present embodiment described with reference to FIG. 4, the arrangement of the excitation light that is emitted from the multiple light sources of the multiple laser beam sources 21 has a discrete distribution. As illustrated in FIG. 4, the light-flux width D of the excitation light incident on the optical element 28 is the width with which $1/e^2$ of the maximum brightness can be obtained in the envelope of the diagram illustrating the cross section of the brightness. As illustrated in FIG. 5, in view of the light source image of the excitation light on the optical element 28, where the excitation light is emitted from one of the light sources of the laser beam source 21, $D_{single}$ denotes the width with which $1/e^2$ of the maximum brightness the light source image can be obtained. The same applies to the light flux as will be described later.

The optical element 28 according to the present embodiment is described below in detail.

Figure 6:
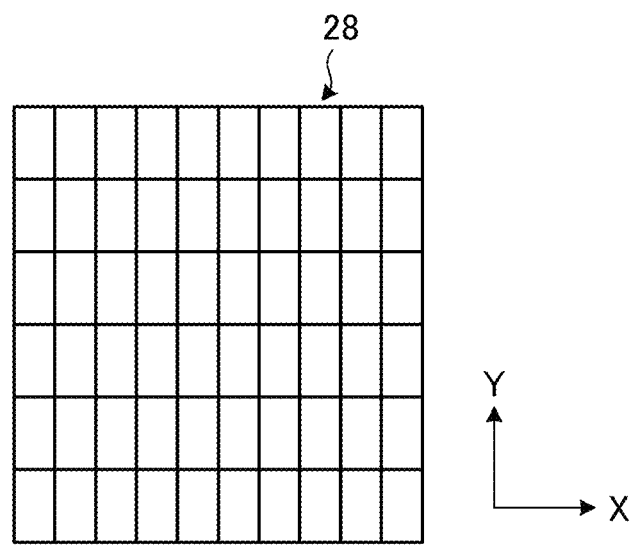
FIG. 6 is a front view of an optical element from a light-incident side on which excitation light is incident, according to an embodiment of the present disclosure.

FIG. 6 is a front view of the optical element 28 from a light-incident side on which excitation light is incident, according to the present embodiment.

Figure 7:
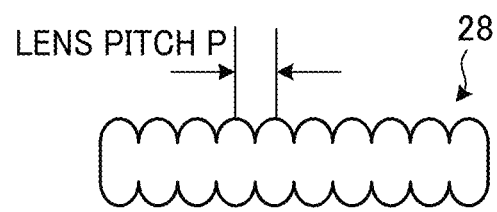
FIG. 7 is a sectional view of an optical element according to an embodiment of the present disclosure.

FIG. 7 is a sectional view of the optical element 28 according to the present embodiment.

As illustrated in FIG. 6 and FIG. 7, the optical element 28 according to the present embodiment is a lens array in which a plurality of rectangular spherical lenses are arrayed on both front and rear sides.

By appropriately designing the focal length of the optical element 28, which serves as a lens array, and the focal length of the second optical system 25, an image having a shape similar to that of each lens of the optical element 28 can be formed on the wavelength conversion element 26. Forming the lens into a rectangular shape enables the light mixing element 30 and the image forming element 50 to utilize the light efficiently.

As illustrated in FIG. 7, the distance between each pair of the vertices of neighboring microlenses of the optical element 28 is a lens pitch P. As described above, the spherical lens has a rectangular shape. In other words, the lens pitches P of the spherical lenses of the optical element 28 differ between the pitch in the X-direction and the pitch in the Y-direction. The spherical lens of the optical element 28 has a rectangular shape such that one side of the rectangle of the multiple lenses will be made approximately parallel to one side of the light mixing element 30 at the entrance and the optical element 28 has a shape approximately similar to that of the light mixing element 30 or the image forming element 50. Accordingly, the vignetting of the light in the optical system decreases, and the light-transforming efficiency can be increased. According to the present embodiment, in the present embodiment, each one of the multiple spherical lenses of the optical element 28 has a rectangular shape. However, no limitation is indicated thereby, and the spherical lens of the optical element 28 may have, for example, a triangular shape or a hexagonal shape.

The dichroic mirror 24 according to the present embodiment is a pane of glass shaped like a parallel plate. More specifically, the dichroic mirror 24 reflects the S-polarized light of wavelength band of the excitation light guided from the first optical system 23, which serves as a first polarized light component, has a coating on the side of the incident plane so as to transmit the P-polarized light of wavelength band of the excitation light guided from the first optical system 23, which serves as a second polarized light component, and the fluorescent light from the wavelength conversion element 26, which serves as a second colored light.

The dichroic mirror 24 shifts its center with respect to the optical axis of the second optical system 25, and makes the excitation light be incident obliquely with respect to the normal to the wavelength conversion element 26. In other words, the excitation light that is emitted from the optical element 28 is turned by the dichroic mirror 24.

In the present embodiment, the dichroic mirror 24 shaped like a flat plate is used as an optical surface that guides the light having passed through the optical element 28 to the wavelength conversion element 26. As the dichroic mirror 24 can efficiently guide the excitation light and the fluorescent light, the efficiency of the light-source optical system can be increased. However, no limitation is indicated thereby, and a prismatic optical surface may be used to guide the light having passed through the optical element 28 to the wavelength conversion element 26. In the present embodiment, the dichroic mirror 24 reflects the S-polarized light of the wavelength band of the excitation light, and transmits the P-polarized light of the wavelength band of the excitation light. On the contrary, the dichroic mirror 24 may reflect the P-polarized light of the wavelength band of the excitation light, and may transmit the S-polarized light of the wavelength band of the excitation light. Typically, a reflex optical element is a simple mirror, but may have wavelength characteristics like a dichroic mirror. Alternatively, the reflex optical element may be a reflex optical element such as a diffractive-optical element (DOE).

As illustrated in FIG. 3A, the optical path excitation light that is reflected by the dichroic mirror 24 is turned by 90 degrees, and the turned excitation light is incident on the second optical system 25 that serves as a condensing optical system. In the present embodiment, the optical axis of the first optical system 23 and the optical axis of the second optical system 25 are substantially decentered from each other. The excitation light that has passed through the second optical system 25 is guided to the wavelength conversion element 26. The excitation light is decentered and incident on the second optical system 25. As the excitation light is incident on the wavelength conversion element 26 at an oblique angle, a desired light-concentrating spot is formed on the wavelength conversion element 26. The excitation light that is reflected by the blue reflection area A3 (see FIG. 8) of the wavelength conversion element 26 passes through the second optical system 25 again, and passes through an area on the other side of the dichroic mirror 24 with respect to the optical axis of the second optical system 25. Then, the excitation light passes through the third optical system 27, and is deflected by optical-path combiner 20C. Finally, the excitation light is incident on the light mixing element 30. The light mixing element 30 achieves equalization on the incident light.

Figure 8:
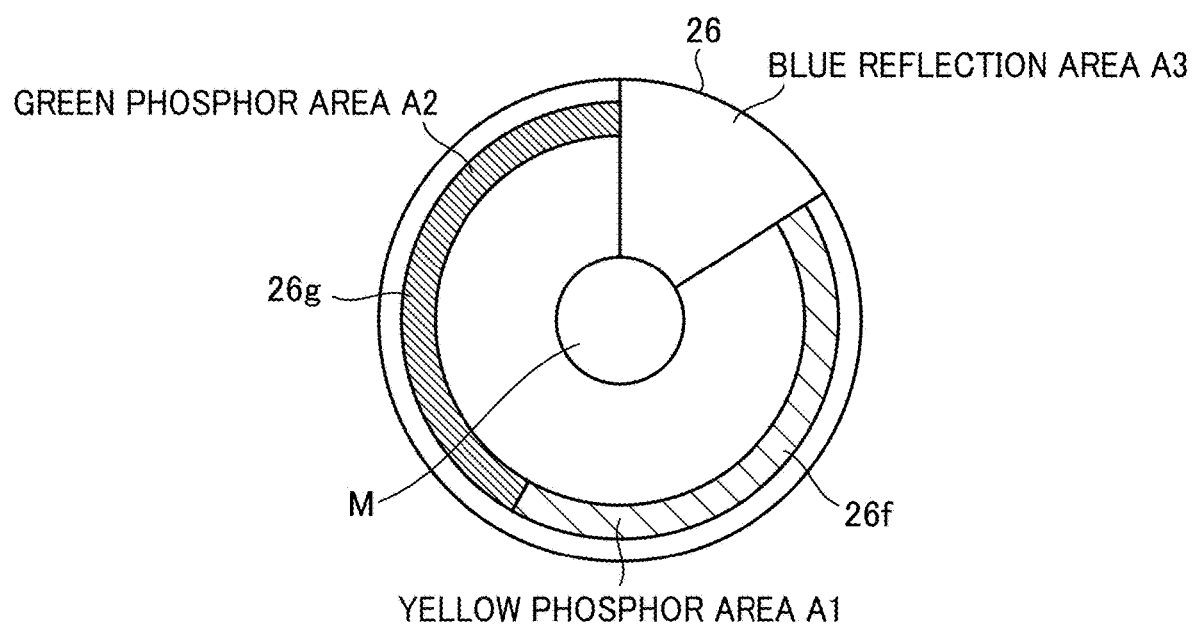
FIG. 8 is a plan view of a wavelength conversion element illustrating its configuration or structure, according to an embodiment of the present disclosure.

As illustrated in FIG. 3A, once the excitation light is incident on the phosphor areas of the wavelength conversion element 26, which refer to the yellow phosphor area A1 and the green phosphor area A2 as illustrated in FIG. 8, the fluorescent light whose wavelength has been converted in response to the excitation light is emitted at an angle of 360 degrees around the fluorescent molecule. The fluorescent light that is emitted from the phosphor area of the wavelength conversion element 26 includes a yellow component or a green component. The excitation light that is reflected by the surface of the substrate 26a (see FIG. 9) of the wavelength conversion element 26 passes through the phosphor area including the yellow phosphor area A1 and the green phosphor area A2 again, and emits the fluorescent light in the Lambert's law of distribution onto the surface of the phosphor area including the yellow phosphor area A1 and the green phosphor area A2. The fluorescent light that is emitted from the phosphor area including the yellow phosphor area A1 and the green phosphor area A2 of the wavelength conversion element 26 is guided to the light mixing element 30 through optical-path combiner 20C (see FIG. 1). More specifically, the fluorescent light is approximately collimated by the second optical system 25, and is deflected by the third optical system 27 so as to be concentrated onto the area around the light mixing element 30. Then, the fluorescent light is deflected by optical-path combiner 20C, and is incident on the light mixing element 30.

Due to such a configuration, as illustrated in FIG. 3A, the excitation light that is reflected by the wavelength conversion element 26 is not interfered by, for example, the dichroic mirror 24 can be guided to the light mixing element 30, and a reduction in efficiency and an increase in the size of the optical system can be prevented.

In the present embodiment, the excitation light that is reflected by the wavelength conversion element 26 does not pass through the dichroic mirror 24. However, no limitation is indicated thereby. For example, the dichroic mirror 24 may be increased in size, or the dichroic mirror 24 whose coating on one side reflects the excitation light and allows the fluorescent light to pass through, where the coating on the other side allows both the excitation light and the fluorescent light pass through, may be used.

In such a configuration, when the excitation light is incident on the phosphor area including the yellow phosphor area A1 and the green phosphor area A2 (see FIG. 8) of the wavelength conversion element 26, the fluorescent light is emitted from the plane on which the excitation light that is incident, and is incident on the second optical system 25. Some of the light that has passed through the second optical system 25 passes through the excitation-light reflector of the dichroic mirror 24, and is incident on the third optical system 27. The light is then guided to the light mixing element 30 and the color wheel 90.

FIG. 8 is a plan view of the wavelength conversion element 26 illustrating its configuration or structure, according to the present embodiment.

As illustrated in FIG. 8, the wavelength conversion element 26 according to the present embodiment is shaped like a disc. The wavelength conversion element 26 according to the present embodiment is a wavelength-conversion plate on which three band-like segments are formed at a desired angle around a plate shaped like a disc. Such three band-like segments include a yellow phosphor area A1 that serves as a first wavelength conversion area provided with a phosphor 26f that serves as a wavelength converter, a green phosphor area A2 that serves as a second wavelength conversion area provided with a phosphor 26g that serves as a wavelength converter, and a blue reflection area A3 that reflects the light emitted from the laser beam source 21 that serves as an excitation light source. In other words, the blue reflection area is a no-conversion area from which the light is emitted without converting the wavelength of the light received from the laser beam sources 21 that serve as a plurality of excitation light sources.

For example, the yellow phosphor area A1 is formed of a phosphor 26f of yellow color that receives the blue laser beam as the excitation light and emits the fluorescent light with the wavelength band of yellow color. For example, the green phosphor area A2 is formed of a phosphor 26g of green color that receives the blue laser beam as the excitation light and emits the fluorescent light with the wavelength band of green color.

In the present embodiment, two kinds of phosphor including the yellow phosphor area A1 and the green phosphor area A2 are used. However, no limitation is indicated thereby. For example, only the yellow phosphor area A1 may be used, or a red phosphor area may further be added. Alternatively, the wavelength conversion element 26 may have a plurality of blue reflection areas A3.

The wavelength conversion element 26 shaped like a disc is driven to rotate at high speed by a driver controlled by the controller 80. As a result, the yellow phosphor area A1, the green phosphor area A2, and the blue reflection area A3 can sequentially be moved at prescribed time intervals. Typically, it is desired that the rotary motor M be used as a driver.

In the wavelength conversion element 26, as the driver is driven to rotate, the yellow phosphor area A1, the green phosphor area A2, and the blue reflection area A3 are switched at the light-concentrating spot to which the light is emitted from the laser beam source 21 that serves as an excitation light source, and the light with different wavelengths is emitted on a time-division basis.

In the light source unit 20A or the light source unit 20B according to the present embodiment, for example, a light-absorbing member or a reflector are arranged on a wheel of the wavelength conversion element 26 or a member that supports the wheel to rotate, and detection is performed using a photocoupler. By so doing, the rotation speeds of the pair of wavelength conversion elements 26 are made equivalent to each other.

Figure 9:
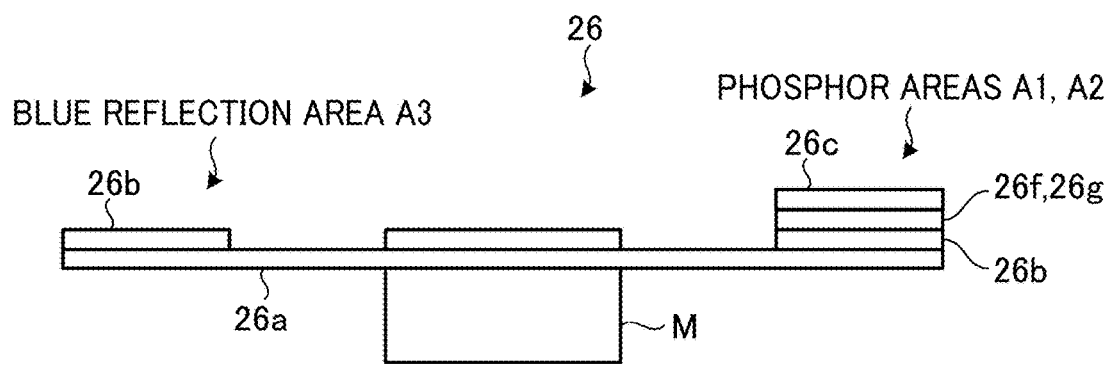
FIG. 9 is a sectional view of a wavelength conversion element according to an embodiment of the present disclosure.

FIG. 9 is a sectional view of the wavelength conversion element 26 according to the present embodiment.

In the present embodiment, a transparent substrate or a metallic substrate such as a substrate made of aluminum may be used as the substrate 26a of the wavelength conversion element 26. However, the substrate 26a of the wavelength conversion element 26 is not limited to a metallic substrate.

In the blue reflection area A3 that reflects the excitation light, for example, a reflective coating 26b that has high reflectivity for the excitation light may be formed on the substrate 26a, and a metallic substrate may be formed as a reflection area as described above.

In the phosphor area including the yellow phosphor area A1 and the green phosphor area A2, the reflective coating 26b that reflects the light whose wavelength is within a wavelength range of the light emitted from the phosphor 26f and the phosphor 26g, the phosphor 26f and the phosphor 26g, and an antireflection (AR) coating 26c that reduces the reflection on a phosphor surface are mounted on the substrate 26a in the order listed. However, the configuration or structure of the phosphor area including the yellow phosphor area A1 and the green phosphor area A2 is not limited to the above configuration or structure. When the substrate 26a is a metallic substrate, the reflective coating 26b may be omitted.

The phosphor 26f and the phosphor 26g may be a layer in which a fluorescent material is distributed inside an organic binder or an inorganic binder, or a layer to which the crystal of fluorescent material is directly formed. For example, a rare-earth fluorescent material such as Ce:YAG materials may be used as the fluorescent material. However, no limitation is indicated thereby, and for example, a phosphor or nonlinear optical crystal may be used as the fluorescent material.

The fluorescent light that is emitted from the phosphor has the wavelength bands of, for example, yellow, blue, green, and red. In the present embodiment, fluorescent light having the wavelength band of yellow and the wavelength band of green is used.

Currently, there is an increasing demand for a highly-efficient light-source optical system and a downsized apparatus in the projector 1. In order to increase the efficiency of the light-source optical system, the light-transforming efficiency of the wavelength conversion element 26 needs to be increased. The light-transforming efficiency of the wavelength conversion element 26 varies depending on the density of the optical energy of the excitation light incident on a wavelength conversion material. More specifically, when the density of the optical energy of the light incident on the wavelength conversion element 26 is high, a temperature rise tends to occur, or the number of the excitable electrons of the phosphor area including the yellow phosphor area A1 and the green phosphor area A2 tends to be reduced. In such cases, the light-transforming efficiency of the wavelength conversion element 26 decreases. In order to avoid such a situation, the light-transforming efficiency of the wavelength conversion element 26 can be increased by reducing the density of the optical energy.

By contrast, if the light spot of the excitation light on the wavelength conversion element 26 is increased in size in order to reduce the density of the optical energy of the excitation light on the wavelength conversion element 26, the vignetting on the laser beams in, for example, an optical system at a subsequent stage tends to increase. Accordingly, the utilization efficiency of the light of the entire projector 1 in its entirety decreases.

In other words, the density of the optical energy needs to be decreased and the size of the light spots needs to be optimized in order to increase the utilization efficiency of the light in the projector 1.

In view of these circumstances, the sizes of the multiple components of the light-source device 20 according to the present embodiment are determined or set as follows.

As illustrated in FIG. 3B, the light-flux width of the excitation-light image formed on the dichroic mirror 24 is referred to as $D_{mirror}$. The outside diameter of the optical element of the second optical system 25 on the side of the incident plane is referred to as $D_{opt}$. In the present embodiment, the positive lens 25a is used as the optical element of the second optical system 25 on the side of the incident plane. $D_{opt}$ denotes the maximum length among lengths from one end to the other end of the positive lens 25a passing through the center point when the positive lens 25a is viewed from the incident side. This is defined in consideration of not only a perfect circle but also an ellipse.

In the present embodiment, it is assumed that the lens pitch P with which $1/e^2$ of the maximum brightness of the light source image of the excitation light on the optical element 28 can be obtained, where the excitation light is emitted from one of the light sources of the laser beam source 21, is equal to or smaller than one-half of the width $D_{single}$. Accordingly, the pitch on the microlens array is optimized for the light source image of one light source. As a result, the phosphor-like light source image can be uniformized and even.

It is assumed that the lens pitch P is equal to or less than one-quarter of the width D of the light flux incident on the optical element 28. Further, the width D of the light flux incident on the optical element 28 is equal to or smaller than one-third of the outside diameter $D_{opt}$ of the optical element, i.e., the positive lens 25a of the second optical system 25 on the side of the incident plane. Due to such a configuration, the dichroic mirror 24 can be downsized, and the interference between components and the light can be avoided. As a result, an increase in efficiency and a reduction in size can be achieved. Further, the light-flux width $D_{mirror}$ of the image of the excitation light on the dichroic mirror 24 is equal to or smaller than one-third of the outside diameter $D_{opt}$.

In the optical element 28 that is a lens array in which a plurality of rectangular spherical lenses are arrayed on both front and rear sides, it is assumed that the lens pitch P satisfies a condition on both the front side and the rear side.

Some examples of the intensity distribution of an image on the wavelength conversion element 26 are described below.

First Example

First of all, the first example of the present disclosure is described below.

Figures 10, 11:
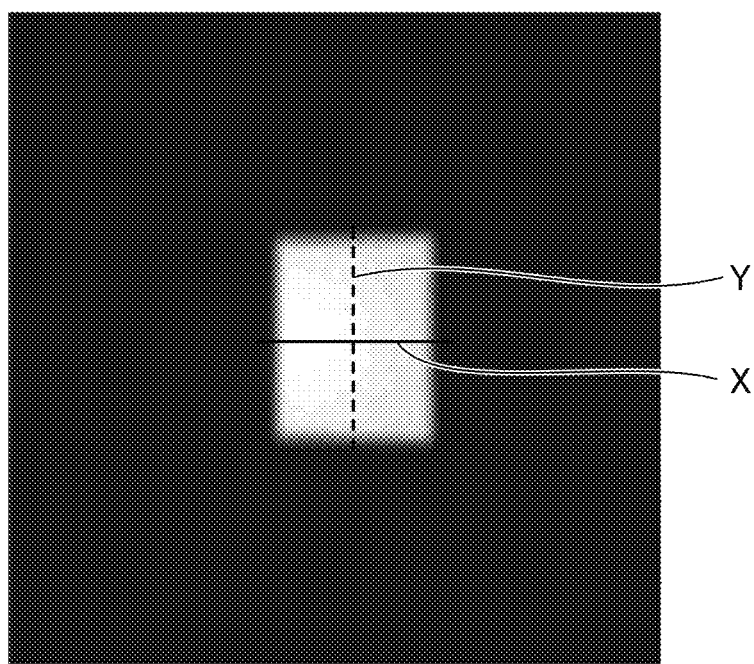
FIG. 10 is a table indicating the sizes of a plurality of components of a light source unit according to a first example of the present disclosure.
FIG. 11 is a diagram illustrating an image on a wavelength conversion element, according to an embodiment of the present disclosure.

FIG. 10 is a table indicating the sizes of a plurality of components of the light-source device 20 according to the first example of the present disclosure.

As illustrated in FIG. 10, the sizes of the multiple components of the light-source device 20 according to the first example of the present disclosure satisfy the multiple conditions given below.

$D/D_{opt} < 1/3$ $P/D < 1/4$ $D_{mirror}/D_{opt} < 1/3$ $P/D_{single} < 1/2$

FIG. 11 is a diagram illustrating an image on the wavelength conversion element 26, according to the present embodiment.

Figures 12, 13:
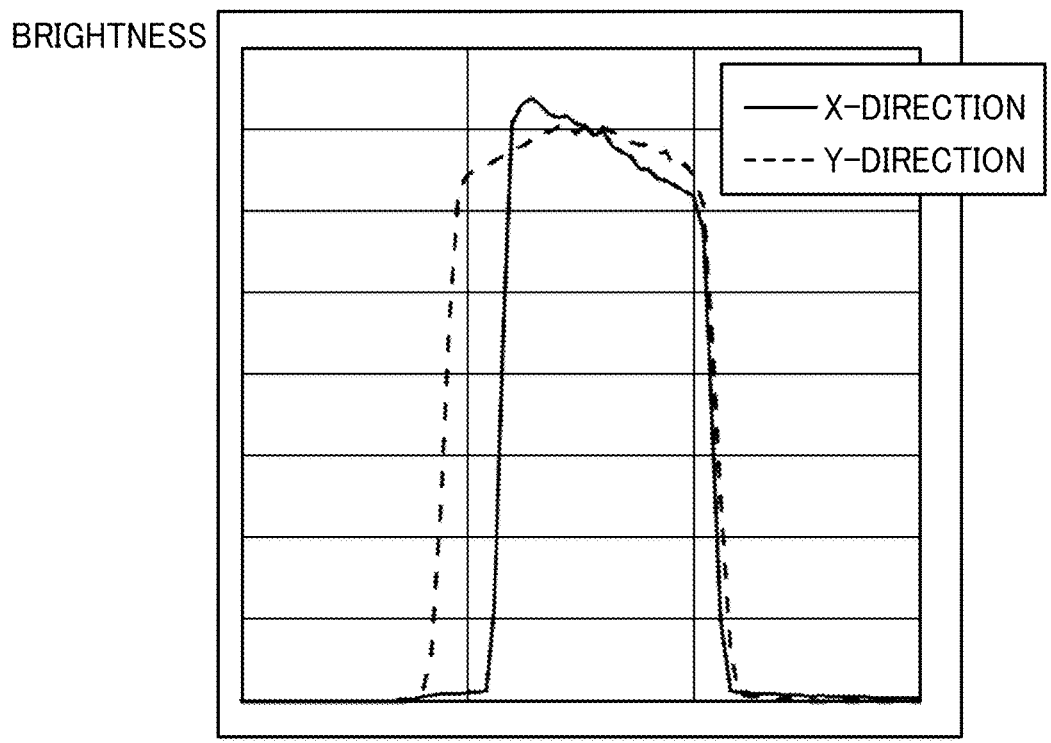
FIG. 12 is a diagram illustrating a distribution of the brightness of an image on a wavelength conversion element, according to an embodiment of the present disclosure.
FIG. 13 is a table indicating the sizes of a plurality of components of a light source unit according to a second example of the present disclosure.

FIG. 12 is a diagram illustrating a distribution of the brightness of an image on the wavelength conversion element 26, according to the present embodiment.

FIG. 12 illustrates the brightness in the X-axis direction and the Y-axis direction as illustrated in FIG. 11.

According to the distribution of the brightness of the image formed on the wavelength conversion element 26 as illustrated in FIG. 12 when a condition is satisfied that the lens pitch P is equal to or less than one-quarter of the width D of the light flux incident on the optical element 28, it is understood that the distribution of the brightness is shaped like a top hat and the image on the wavelength conversion element 26 is an even image as a whole. Accordingly, the temperature of the wavelength conversion element 26 can be prevented from increasing locally. As a result, the light-transforming efficiency of the wavelength conversion element 26 can be increased.

Second Example

A second example of the present disclosure is described below.

FIG. 13 is a table indicating the sizes of a plurality of components of the light-source device 20 according to the second example of the present disclosure.

As illustrated in FIG. 13, the sizes of the multiple components of the light-source device 20 according to the second example of the present disclosure satisfies a plurality of conditions given below.

$D/D_{opt} < 1/3$
$P/D < 1/4$
$D_{mirror}/D_{opt} < 1/3$
$P/D_{single} < 1/2$

Figure 14:
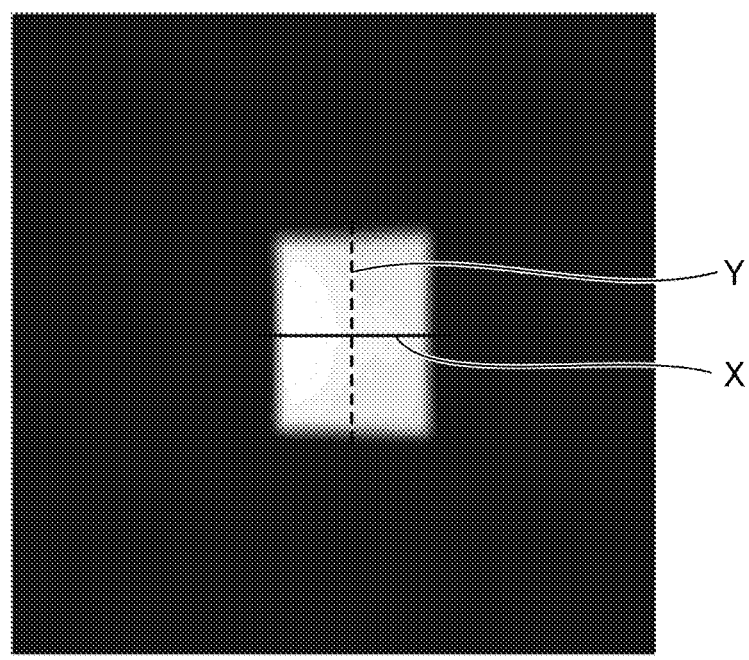
FIG. 14 is a diagram illustrating an image on a wavelength conversion element, according to an embodiment of the present disclosure.

FIG. 14 is a diagram illustrating an image on the wavelength conversion element 26, according to the present embodiment.

Figure 15:
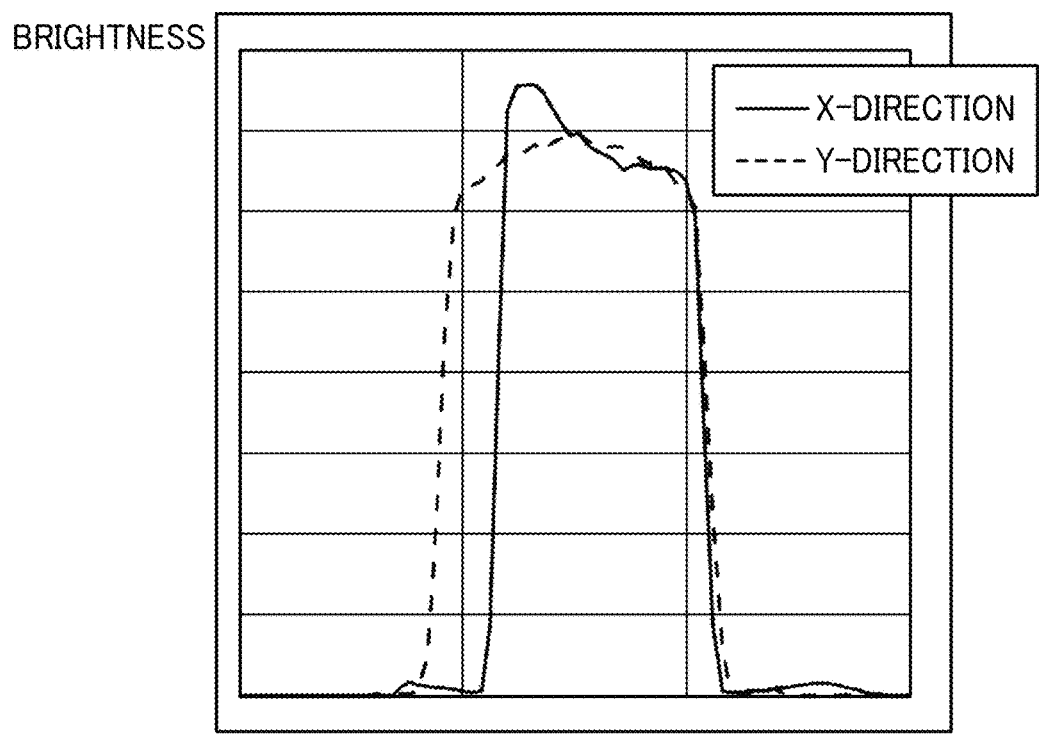
FIG. 15 is a diagram illustrating a distribution of the brightness of an image on a wavelength conversion element, according to an embodiment of the present disclosure.

FIG. 15 is a diagram illustrating a distribution of the brightness of an image on the wavelength conversion element 26, according to the present embodiment.

FIG. 15 illustrates the brightness in the X-axis direction and the Y-axis direction as illustrated in FIG. 14.

According to the distribution of the brightness of the image formed on the wavelength conversion element 26 as illustrated in FIG. 15 when a condition is satisfied that the lens pitch P is equal to or less than one-quarter of the width D of the light flux incident on the optical element 28, the brightness in the second example of the present disclosure is slightly weakened compared with the first embodiment of the present disclosure. However, it is understood that the distribution of the brightness is shaped like a top hat and the image on the wavelength conversion element 26 is an even image as a whole. Accordingly, the temperature of the wavelength conversion element 26 can be prevented from increasing locally, and the light-transforming efficiency of the wavelength conversion element 26 can be increased.

Control Sample

A control sample of the above embodiments of the present disclosure is described below.

Figures 16, 17:
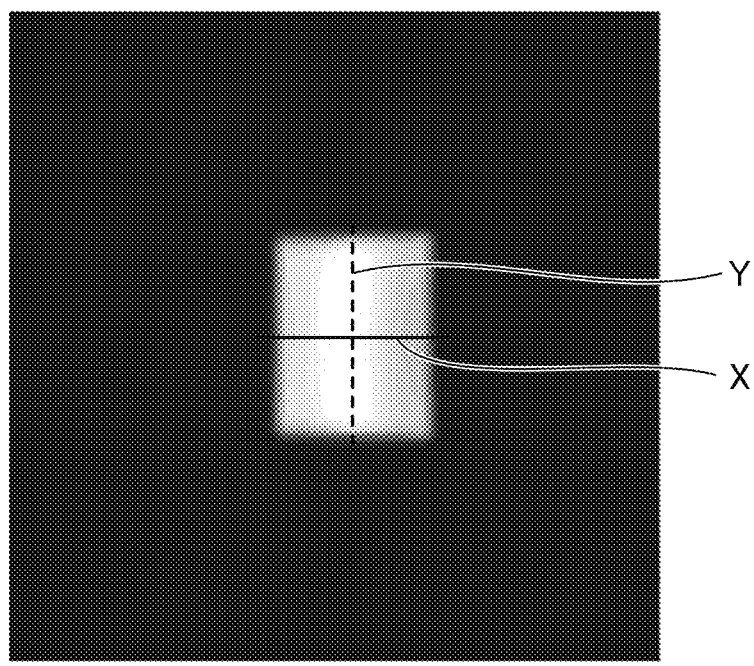
FIG. 16 is a table indicating the sizes of a plurality of components of a light source unit according to a control sample of the above examples of the present disclosure.
FIG. 17 is a diagram illustrating an image on a wavelength conversion element, according to an embodiment of the present disclosure.

FIG. 16 is a table indicating the sizes of a plurality of components of the light-source device 20 according to a control sample of the above examples of the present disclosure.

As illustrated in FIG. 16, the sizes of the multiple components of the light-source device 20 according to the present control sample of the above examples of the present disclosure do not satisfy the condition given below. This is because the number of lenses of the lens array that are arranged within the width D of the light flux incident on the optical element 28 is insufficient.

$P/D < 1/4$

FIG. 17 is a diagram illustrating an image on the wavelength conversion element 26, according to the present embodiment.

Figure 18:
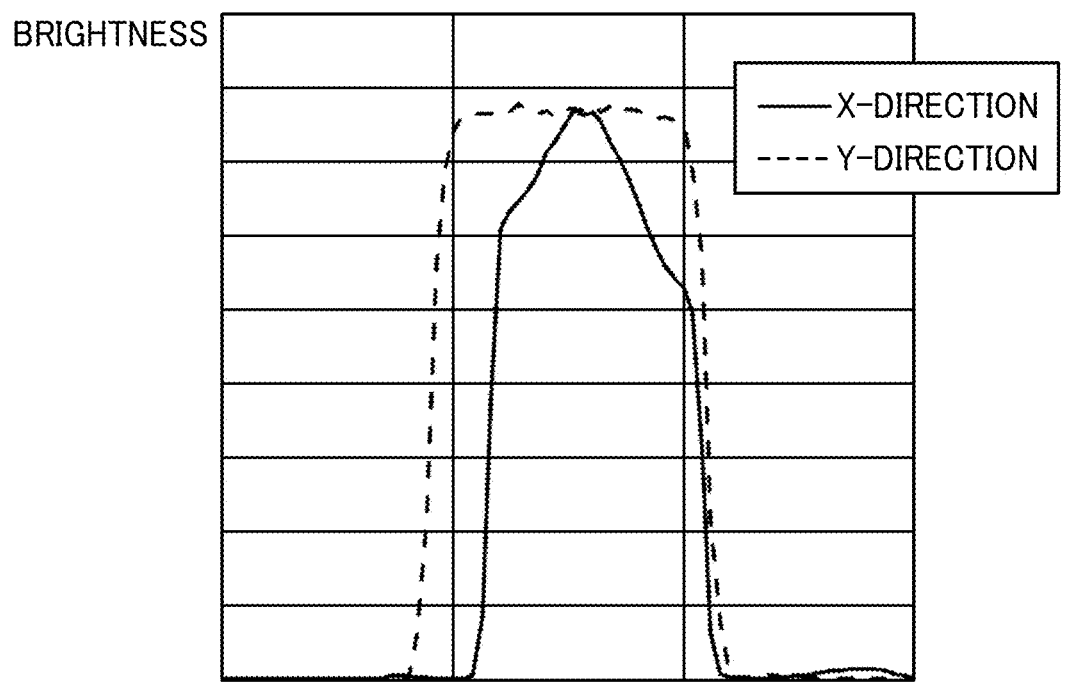
FIG. 18 is a diagram illustrating a distribution of the brightness of an image on a wavelength conversion element, according to an embodiment of the present disclosure.

FIG. 18 is a diagram illustrating a distribution of the brightness of an image on the wavelength conversion element 26, according to the present embodiment.

FIG. 18 illustrates the brightness in the X-axis direction and the Y-axis direction as illustrated in FIG. 17.

When the above conditions are not met, as illustrated in FIG. 18, a locally concentrated portion tends to appear especially at the center in the X-direction. As a result, the temperature of the wavelength conversion element 26 increases, and the light-transforming efficiency tends to deteriorate significantly.

As described above, according to the above embodiments of the present disclosure, vignetting does not occur in the third optical system 27 at a subsequent stage and a plurality of light spots can uniformly be formed on the wavelength conversion element 26. As a result, the light-transforming efficiency of the wavelength conversion element 26 can be increased.

In the present embodiment, the optical element 28 according to the present embodiment is a lens array in which a plurality of rectangular spherical lenses are arrayed on both front and rear sides. However, no limitation is indicated thereby.

Figure 19:
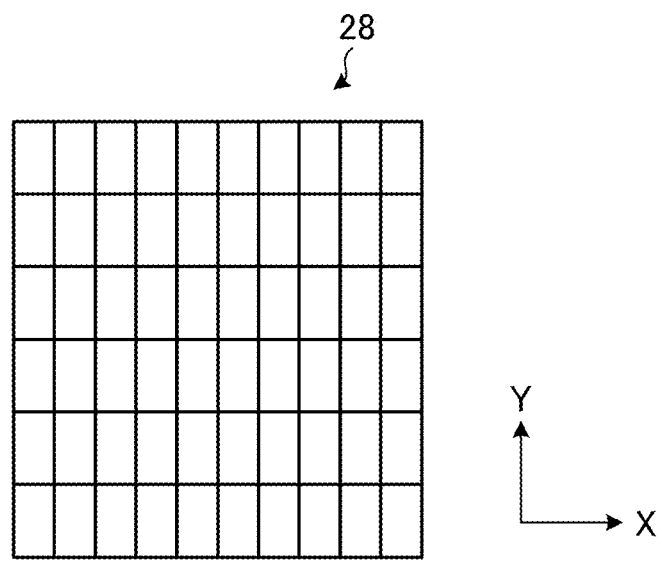
FIG. 19 is a front view of an optical element from a light-incident side on which excitation light is incident, according to a modification of the above embodiments of the present disclosure.

FIG. 19 is a front view of the optical element 28 from a light-incident side on which excitation light is incident, according to a modification of the above embodiments of the present disclosure.

Figure 20:
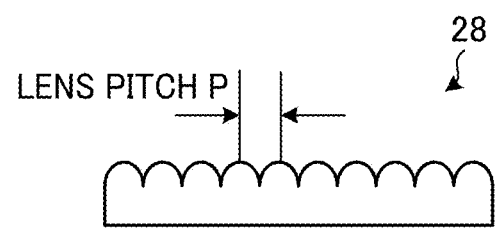
FIG. 20 is a sectional view of an optical element according to a modification of the above embodiments of the present disclosure.

FIG. 20 is a sectional view of the optical element 28 according to a modification of the above embodiments of the present disclosure.

As illustrated in FIG. 19 and FIG. 20, the optical element 28 may have a lens array only on one of the two sides including the side on which the excitation light is incident and the side from which the excitation light exits. Such an optical element 28 is slightly inferior in uniformity as compared with an optical element having a couple of lens arrays on both front and rear sides, but sufficient uniformity can be achieved.

Second Embodiment

A second embodiment of the present disclosure is described below.

The second embodiment of the present disclosure is different from the first embodiment of the present disclosure in that the excitation light passes through the dichroic mirror 24. Note that like reference signs are given to elements similar to those described in the first embodiment, and their detailed description is omitted in the description of the second embodiment of the present disclosure given below.

Figure 21:
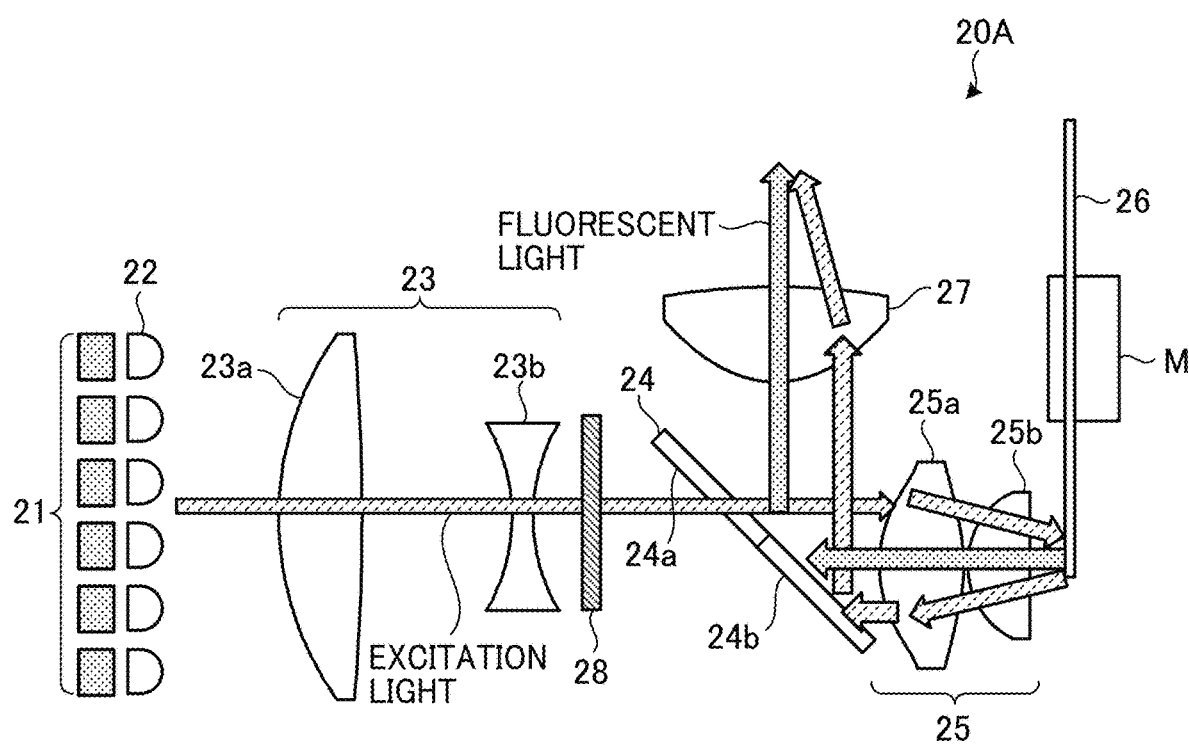
FIG. 21 is a schematic diagram illustrating a configuration or structure of a light source unit according to a second embodiment of the present disclosure.

FIG. 21 is a schematic diagram illustrating a configuration or structure of the light source unit 20A according to a second embodiment of the present disclosure.

The light source unit 20B has a configuration and structure similar to that of the light source unit 20A.

As illustrated in FIG. 21, the dichroic mirror 24 according to the present embodiment is divided into two areas including a first area 24a and a second area 24b on a plane, and the first area 24a through which the excitation light that is emitted from the first optical system 23 passes is configured so as to transmit the light of the wavelength band of the excitation light. The second area 24b through which the excitation light emitted from second optical system 25 passes is configured so as to reflect the light of the wavelength band of the excitation light and reflect the fluorescent light emitted from the wavelength conversion element 26 on its entire surface.

In the present embodiment, a plate-like dichroic mirror is used as the dichroic mirror 24. However, no limitation is indicated thereby, and a prismatic dichroic mirror may be used as the dichroic mirror 24.

More specifically, the excitation light that has passed the first area 24a of the dichroic mirror 24 is incident on the second optical system 25 that serves as a condensing optical system. As illustrated in FIG. 21, in the present embodiment, the optical axis of the first optical system 23 and the optical axis of the second optical system 25 that serves as a condensing optical system are substantially decentered from each other.

The excitation light that has passed through the second optical system 25 that serves as a condensing optical system is guided to the wavelength conversion element 26.

When the excitation light is incident on and passes through the second optical system 25 that serves as a condensing optical system, the excitation light is decentered by the second optical system 25. As a result, the excitation light is incident on the wavelength conversion element 26 at an oblique angle. The configuration or structure of the wavelength conversion element 26 according to the present embodiment is equivalent to that of the first embodiment as described above.

The excitation light incident on the wavelength conversion element 26 is specularly reflected by the blue reflection area A3 of the wavelength conversion element 26. Due to such a configuration, as illustrated in FIG. 21, the excitation light incident on the wavelength conversion element 26 passes through the second optical system 25 that serves as a condensing optical system from the other side of the light entering side, and is emitted from the second optical system 25 that serves as a condensing optical system.

The excitation light that is emitted from the second optical system 25 that serves as a condensing optical system is reflected by the second area 24b of the dichroic mirror 24, and is incident on the third optical system 27. As a result, the excitation light is guided to the light mixing element 30 and the color wheel 90.

When the excitation light is incident on the phosphor area including the yellow phosphor area A1 and the green phosphor area A2 of the wavelength conversion element 26, the fluorescent light is emitted from the plane on which the excitation light that is incident, and is incident on the second optical system 25 that serves as a condensing optical system. At least some of the light that has passed through the second optical system 25 that serves as a condensing optical system is reflected by the second area 24b of the dichroic mirror 24, and is incident on the third optical system 27. Then, the light incident on the third optical system 27 is then guided to the light mixing element 30 and the color wheel 90.

As described above, according to the above embodiments of the present disclosure, vignetting does not occur in the third optical system 27 at a subsequent stage and a plurality of light spots can uniformly be formed on the wavelength conversion element 26. As a result, the light-transforming efficiency of the wavelength conversion element 26 can be increased.

Third Embodiment

A third embodiment of the present disclosure is described below.

The third embodiment of the present disclosure is different from the first embodiment of the present disclosure in that the light flux of the excitation light emitted from the laser beam source 21 is thin and the first optical system 23 does not exist. Note that like reference signs are given to elements similar to those described in the first embodiment, and their detailed description is omitted in the description of the third embodiment of the present disclosure given below.

Figure 22:
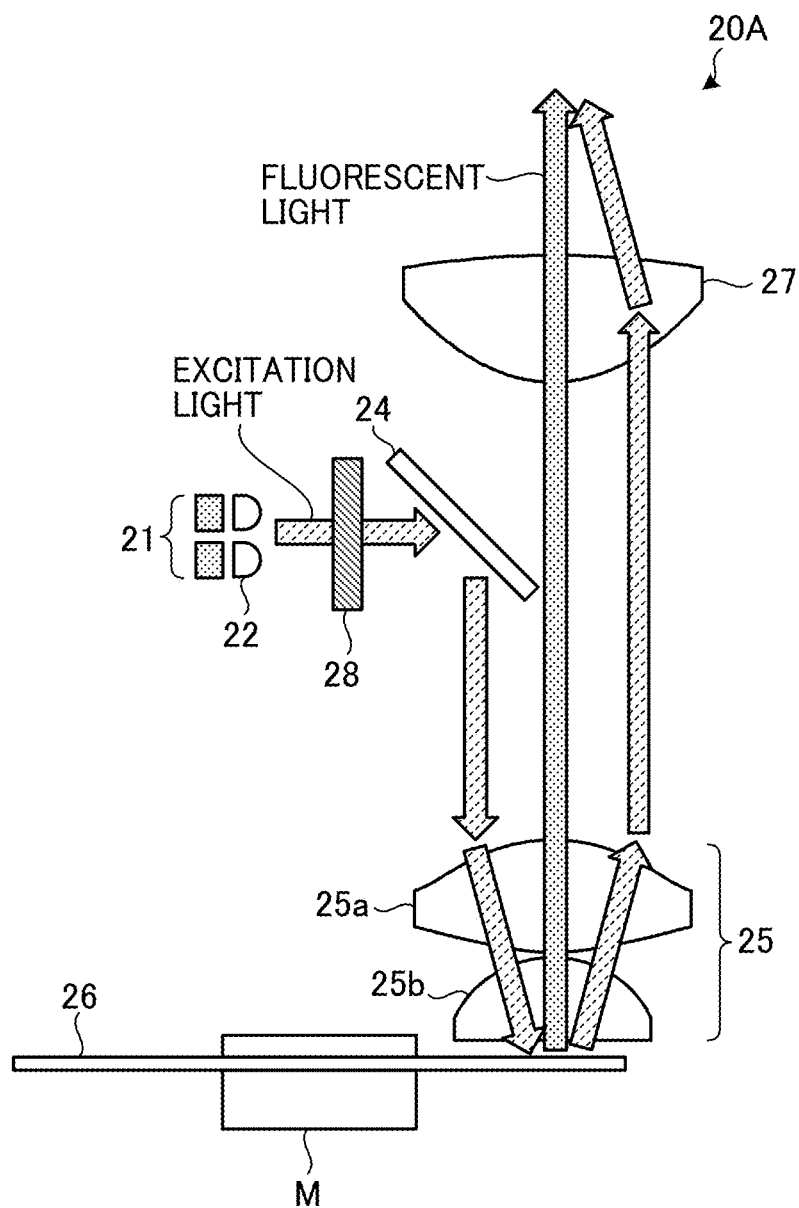
FIG. 22 is a schematic diagram illustrating a configuration or structure of a light source unit according to a third embodiment of the present disclosure.

FIG. 22 is a schematic diagram illustrating a configuration or structure of the light source unit 20A according to a third embodiment of the present disclosure.

The light source unit 20B has a configuration and structure similar to that of the light source unit 20A.

As illustrated in FIG. 22, the laser beam source 21 according to the present embodiment includes a plurality of light sources that serve as a plurality of light-emitting points. As the laser beam source 21, a laser diode (LD) in which a plurality of light-emitting points are two-dimensionally arrayed is used. In FIG. 22, two light sources that are arranged in the up-and-down directions are illustrated. However, in actuality, two light sources are arranged in four rows in the depth direction orthogonal to the sheet, and eight (2×4) light sources are arrayed in two dimensions. The multiple light sources of the laser beam source 21 emit a blue laser beam in a wavelength band of blue, where the central wavelength in light-emission intensity is, for example, 455 nanometers (nm), as the excitation light that excites the phosphor provided for the wavelength conversion element 26. The wavelength band is not limited to the light in a wavelength band of blue, and is satisfactory as long as it is the light in a wavelength that can excite the phosphor. In the present embodiment described with reference to FIG. 22, a plurality of laser beam sources are used as the laser beam source 21. However, no limitation is indicated thereby, and a single laser beam source may be used as the laser beam source 21. A light source unit that is a substrate on which a plurality of light sources are arrayed may be used as the multiple laser beam sources that make up the laser beam source 21 according to the present embodiment. However, no limitation is indicated thereby.

As illustrated in FIG. 22, the center line of the light flux of laser beams formed by a plurality of laser beam sources or a single laser beam source that makes up the laser beam source 21 is used as the main light beam in the present embodiment. In order to achieve a light source that emits light with relatively small light flux, for example, vertical-cavity surface-emitting lasers (VCSEL), which is a kind of semiconductor laser, are used as the laser beam source 21 according to the present embodiment.

The excitation light that is emitted from the laser beam source 21 is approximately collimated by the multiple collimator lenses 22 that correspond to the multiple light sources. The excitation light that is approximately collimated passes through the optical element 28, and then is guided to the dichroic mirror 24 that is arranged at an angle of 45 degrees with respect to the main light beam.

According to the above embodiments of the present disclosure, vignetting does not occur in the third optical system 27 at a subsequent stage and a plurality of light spots can uniformly be formed on the wavelength conversion element 26 even with a small and inexpensive configuration or structure. As a result, the light-transforming efficiency of the wavelength conversion element 26 can be increased.

Fourth Embodiment

A fourth embodiment of the present disclosure is described below.

The fourth embodiment of the present disclosure is different from the first embodiment of the present disclosure in that the wavelength conversion element 26 is differently configured and the color wheel 90 is omitted. Moreover, the fourth embodiment of the present disclosure is different from the first embodiment of the present disclosure in that the third optical system 27 is omitted. Note that like reference signs are given to elements similar to those described in the first embodiment, and their detailed description is omitted in the description of the fourth embodiment of the present disclosure given below.

Figure 23:
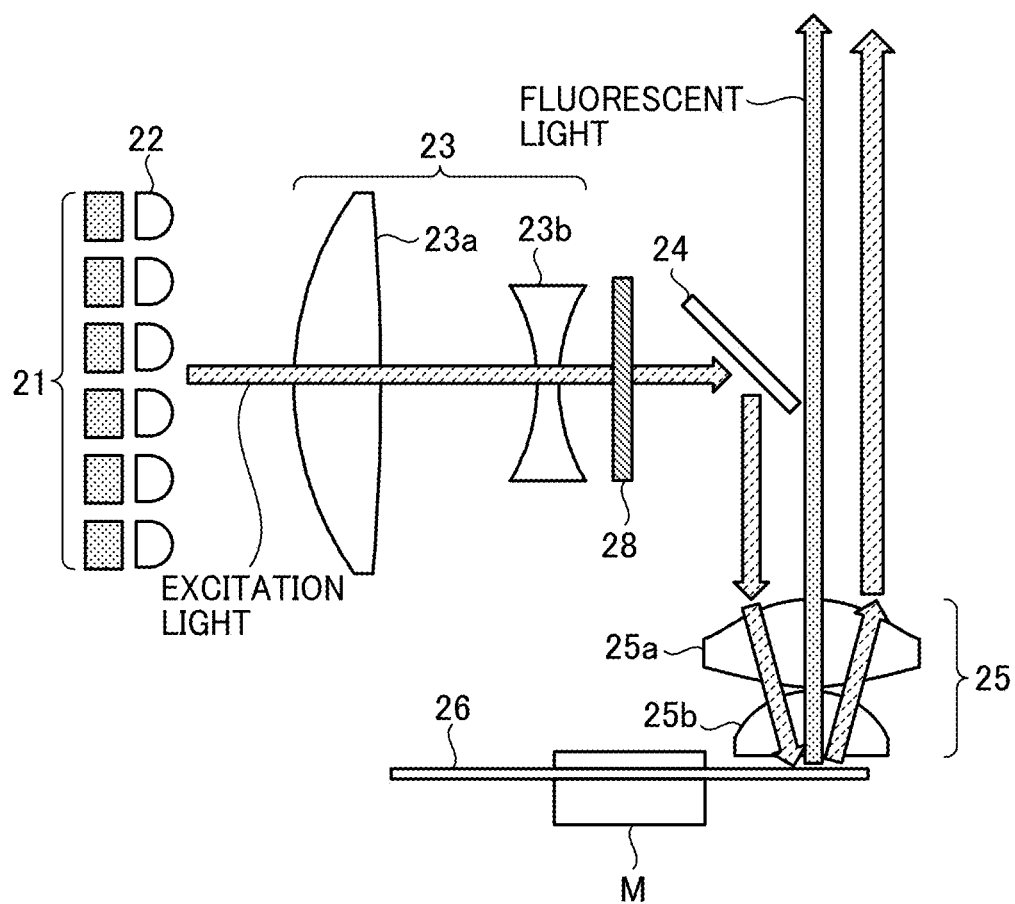
FIG. 23 is a schematic diagram illustrating a configuration or structure of a light source unit according to a fourth embodiment of the present disclosure.

FIG. 23 is a schematic diagram illustrating a configuration or structure of the light source unit 20A according to the fourth embodiment of the present disclosure.

Figure 24:
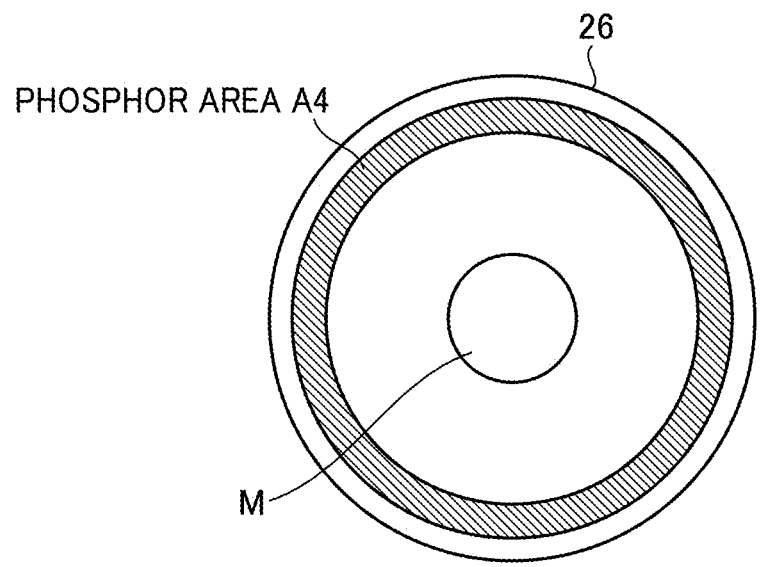
FIG. 24 is a plan view of a wavelength conversion element illustrating its configuration or structure, according to an embodiment of the present disclosure.

FIG. 24 is a plan view of the wavelength conversion element 26 illustrating its configuration or structure, according to the present embodiment.

Figure 25:
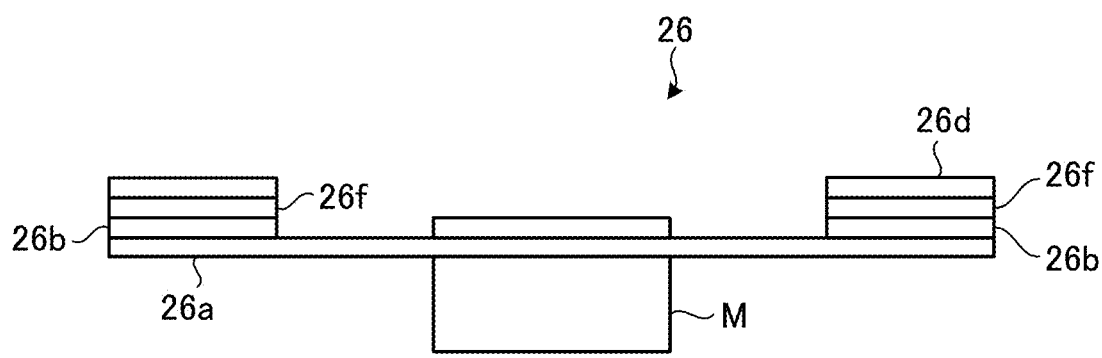
FIG. 25 is a sectional view of a wavelength conversion element according to an embodiment of the present disclosure.

FIG. 25 is a sectional view of the wavelength conversion element 26 according to the present embodiment.

The light source unit 20B has a configuration and structure similar to that of the light source unit 20A.

As illustrated in FIG. 24, the wavelength conversion element 26 according to the present embodiment is different from the first embodiment of the present disclosure in that the wavelength conversion element 26 is not divided into several areas and only has a single phosphor area A4 in the circumferential direction.

As illustrated in FIG. 25, in the wavelength conversion element 26, the reflective coating 26b that reflects the light whose wavelength is within a wavelength range of the fluorescent light and the excitation light, the phosphor 26f, and a reflective coating 26d that reflects a portion of the excitation light and transmits a portion of the fluorescent light and the excitation light are formed on the substrate 26a. The phosphor 26f may be a layer in which a fluorescent material is distributed inside an organic binder or an inorganic binder, or a layer to which the crystal of fluorescent material is directly formed. For example, a rare-earth phosphor such as Ce:YAG materials may be used as the fluorescent material. However, no limitation is indicated thereby. For example, when the wavelength band of the light emitted from the phosphor is yellow, white light can be obtained by combining the yellow light with the blue of the excitation light. In the present embodiment, the reflection coating 26d is arranged on the light entering side. However, no limitation is indicated thereby, and the reflective coating 26d may be arranged on, for example, the light diffusing side.

Return to FIG. 23. As illustrated in FIG. 23, the excitation light reflected by the reflection coating 26b of the wavelength conversion element 26 is passes through the second optical system 25 again, and the excitation light that is emitted from the second optical system 25 without passing through the dichroic mirror 24 guided to the illumination optical system in a subsequent stage.

The fluorescent light that is emitted as the excitation light is incident on the phosphor 26f of the wavelength conversion element 26 is approximately collimated by the second optical system 25, and a part of the fluorescent light passes through the dichroic mirror 24. As a result, the fluorescent light is guided to the illumination optical system in a subsequent stage.

In the present embodiment, the excitation light is reflected by the dichroic mirror 24. As illustrated in FIG. 21, a configuration or method may be adopted in which the excitation light may pass through the dichroic mirror 24 and be incident on the phosphor 26f.

As described above, according to the above embodiments of the present disclosure, even with an inexpensive configuration or structure with a reduced number of components, a plurality of light spots can uniformly be formed on the wavelength conversion element 26, and the light-transforming efficiency of the wavelength conversion element 26 can be increased.

Fifth Embodiment

A fifth embodiment of the present disclosure is described below.

The fifth embodiment of the present disclosure is different from the first embodiment of the present disclosure in that the blue reflection area of the wavelength conversion element 26 turns to a blue transmissive area and the optical path for blue light turns to an optical path for a different purpose. Note that like reference signs are given to elements similar to those described in the first embodiment, and their detailed description is omitted in the description of the fifth embodiment of the present disclosure given below.

Figure 26:
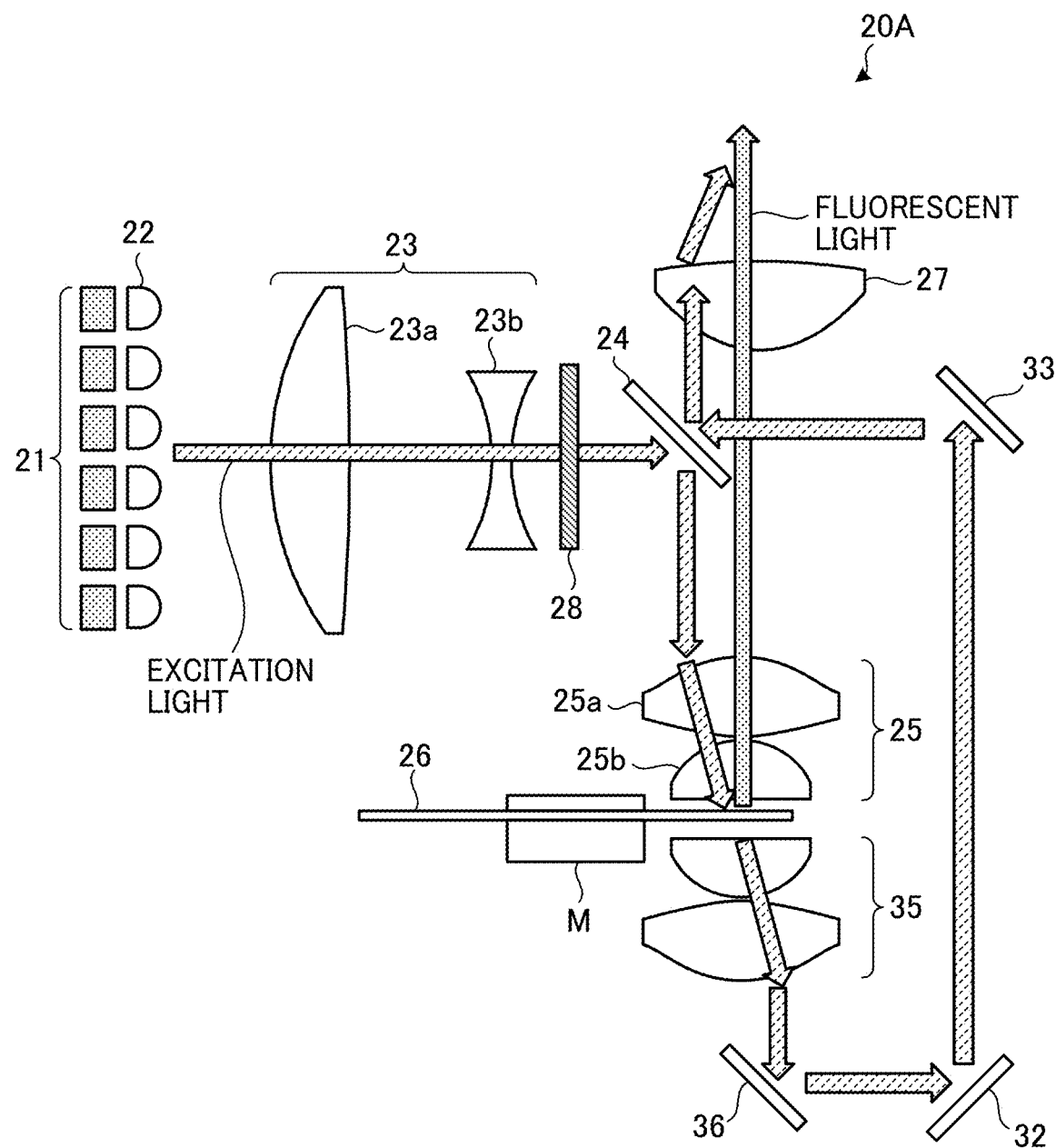
FIG. 26 is a schematic diagram illustrating a configuration or structure of a light source unit according to a fifth embodiment of the present disclosure.

FIG. 26 is a schematic diagram illustrating a configuration or structure of the light source unit 20A according to a fifth embodiment of the present disclosure.

Figure 27:
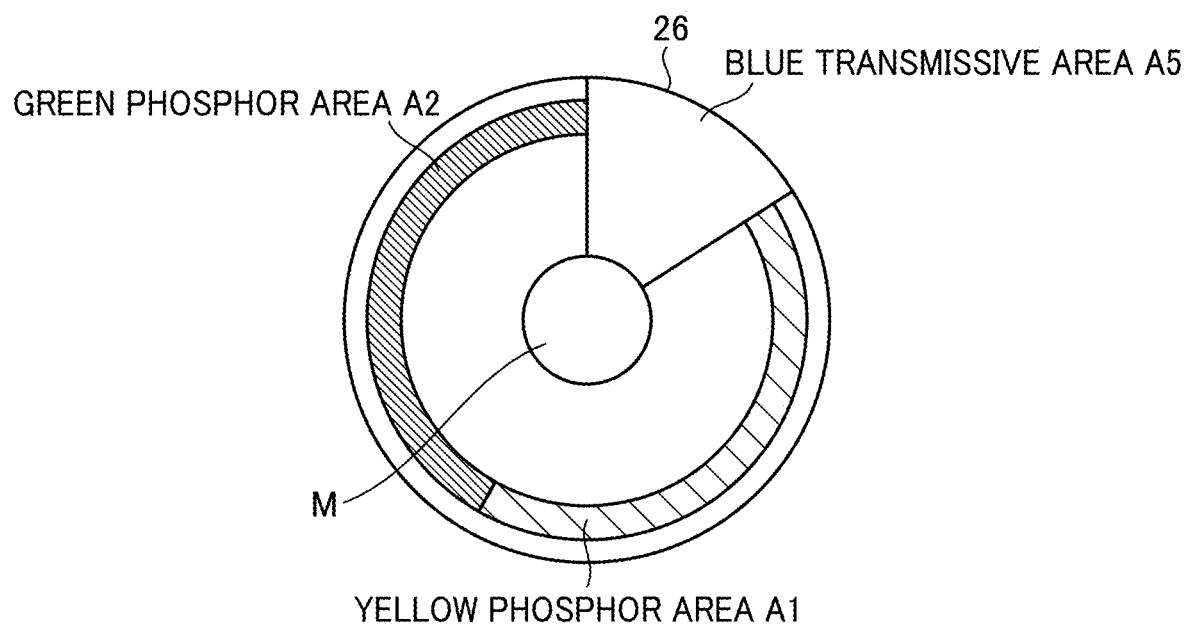
FIG. 27 is a plan view of a wavelength conversion element illustrating its configuration or structure, according to an embodiment of the present disclosure.

FIG. 27 is a plan view of the wavelength conversion element 26 illustrating its configuration or structure, according to the present embodiment.

Figure 28:
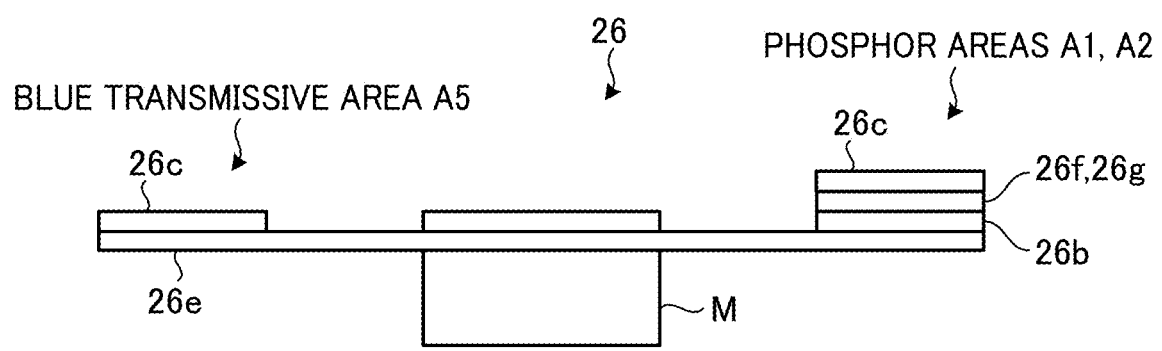
FIG. 28 is a sectional view of a wavelength conversion element according to an embodiment of the present disclosure.

FIG. 28 is a sectional view of the wavelength conversion element 26 according to the present embodiment.

The light source unit 20B has a configuration and structure similar to that of the light source unit 20A.

As illustrated in FIG. 27, in the wavelength conversion element 26 according to the present embodiment, the blue reflection area A3 in the first embodiment is turned into a blue transmissive area A5. As illustrated in FIG. 28, in the blue transmissive area A5 of the wavelength conversion element 26, an antireflection coating (AR coating) 26c is formed on a transparent substrate 26e.

As illustrated in FIG. 26, the excitation light that has passed through the blue transmissive area A5 of the wavelength conversion element 26 is approximately collimated by the condensing optical system, and passes through a fourth optical system 35. Then the excitation light is reflected by a mirror 36, a mirror 32, and a mirror 33, and is guided by the dichroic mirror 24. The light that is guided by the dichroic mirror 24 is combined with the optical path of the fluorescent light by the dichroic mirror 24, and passes through the third optical system 27. As a result, the excitation light is guided to the light mixing element 30 and the color wheel 90.

As described above, according to the above embodiments of the present disclosure, vignetting does not occur in the third optical system 27 at a subsequent stage and a plurality of light spots can uniformly be formed on the wavelength conversion element 26. As a result, the light-transforming efficiency of the wavelength conversion element 26 can be increased.

Sixth Embodiment

A sixth embodiment of the present disclosure is described below.

The sixth embodiment of the present disclosure is different from the first embodiment of the present disclosure in that a parabolic mirror is used as the condensing optical system. Note that like reference signs are given to elements similar to those described in the first embodiment, and their detailed description is omitted in the description of the sixth embodiment of the present disclosure given below.

Figure 29:
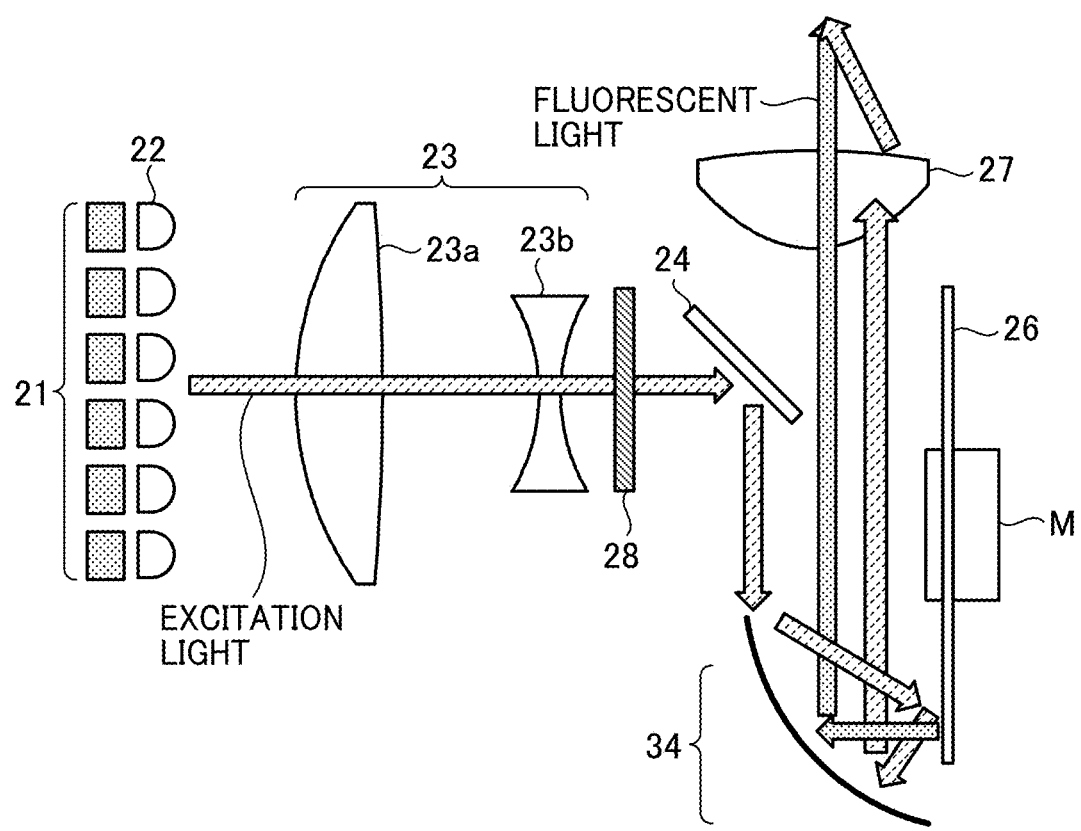
FIG. 29 is a schematic diagram illustrating a configuration or structure of a light source unit according to a sixth embodiment of the present disclosure.

FIG. 29 is a schematic diagram illustrating a configuration or structure of the light source unit 20A according to a sixth embodiment of the present disclosure.

The light source unit 20B has a configuration and structure similar to that of the light source unit 20A.

As illustrated in FIG. 29, the parabolic mirror 34 that serves as a condensing optical system is arranged such that the surface of the wavelength conversion element 26 is located at the focal point of the parabola. Due to such a configuration, a light spot can be formed on the wavelength conversion element 26.

As illustrated in FIG. 29, the excitation light that is reflected by the dichroic mirror 24 is reflected and concentrated by the parabolic mirror 34, and a light spot is formed on the wavelength conversion element 26. The fluorescent light that is emitted by the excitation light is collimated by the parabolic mirror 34, and a part of the fluorescent light passes through the dichroic mirror 24. Then, the fluorescent light is concentrated by the third optical system 27, and is guided to the light mixing element 30 and the color wheel 90.

As illustrated in FIG. 29, the excitation light that is reflected by the blue reflection area A3 of the wavelength conversion element 26 is collimated by a parabolic mirror, and is concentrated by the third optical system 27. As a result, the excitation light is guided to the light mixing element 30 and the color wheel 90.

As described above, according to the above embodiments of the present disclosure, vignetting does not occur in the third optical system 27 at a subsequent stage and a plurality of light spots can uniformly be formed on the wavelength conversion element 26. As a result, the light-transforming efficiency of the wavelength conversion element 26 can be increased.

Seventh Embodiment

A seventh embodiment of the present disclosure is described below.

The seventh embodiment of the present disclosure is different from the first embodiment of the present disclosure in that the incident angle that the laser beams form with optical element 28 can be adjusted and the range of the angle of incidence can be adjusted as desired. Note that like reference signs are given to elements similar to those described in the first embodiment, and their detailed description is omitted in the description of the seventh embodiment of the present disclosure given below.

There is a demand in the art for light-luminance laser beam sources as the laser beam source 21.

In such high-luminance laser beam sources, it is desired that the pitch of the lens array of the optical element be equal to or shorter than one-quarter of the width of the light flux of the light incident on the optical element.

However, when a light-source optical system of the above configuration or structure is assembled, the incident angle that the laser beams form with optical element 28 tends to vary due to the tolerances of the components and the fixation mechanism. As described above, when the incident angle that the laser beams form with optical element 28 varies, the light density of the light spot on the wavelength conversion element 26 becomes uneven, and the light-transforming efficiency of the wavelength conversion element 26 decreases.

Accordingly, in the light-source optical system according to the present embodiment, the incident angle that the laser beams form with optical element 28 can be adjusted, and the range of the angle of incidence can be adjusted as desired.

Figure 30:
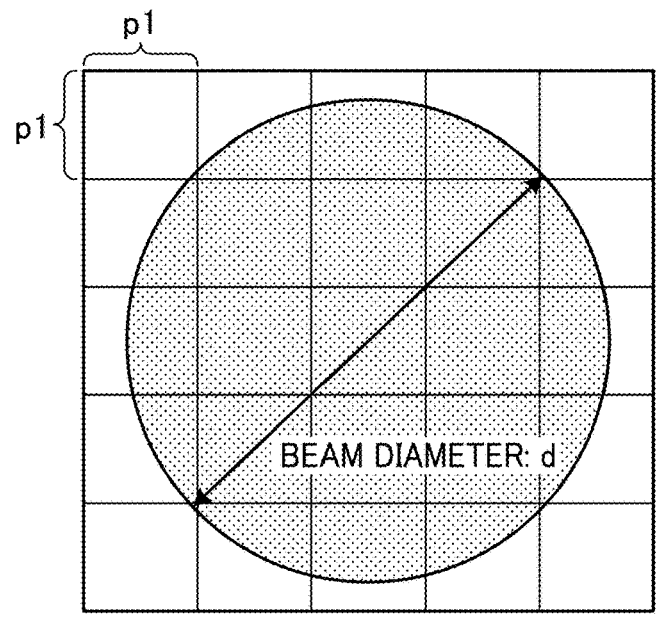
FIG. 30 is a diagram illustrating the relation between the beam size of light flux and the lens pitch of a conventional optical element, according to the related art.

FIG. 30 is a diagram illustrating the relation between the beam size of light flux and the lens pitch of a conventional optical element, according to the related art.

Figure 31:
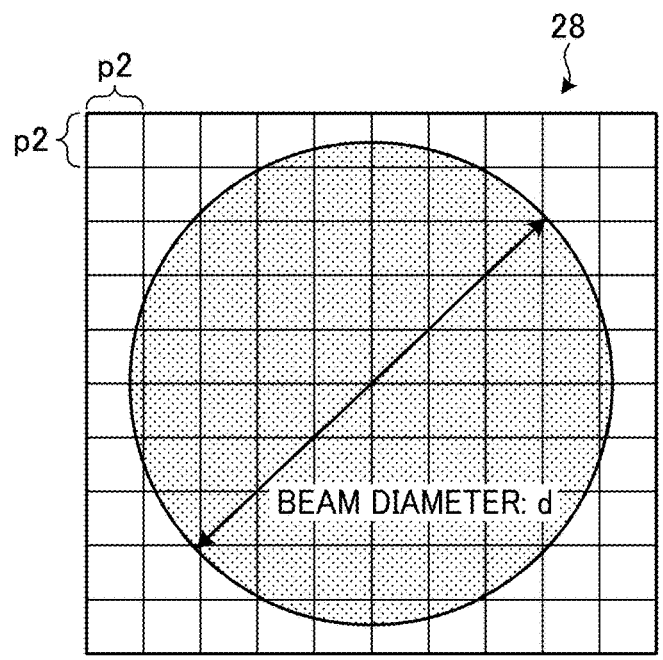
FIG. 31 is a diagram illustrating the relation between the beam size of light flux and the lens pitch of an optical element, according to a seventh embodiment of the present disclosure.

FIG. 31 is a diagram illustrating the relation between the beam size of the light flux and the lens pitch of the optical element 28, according to the seventh embodiment of the present disclosure.

The profile of the light beam may be of Gaussian type or top-hat type, and the term light flux as used herein refers to an area where 80% or more of the total radiation intensity of the light is concentrated.

Figure 32A:
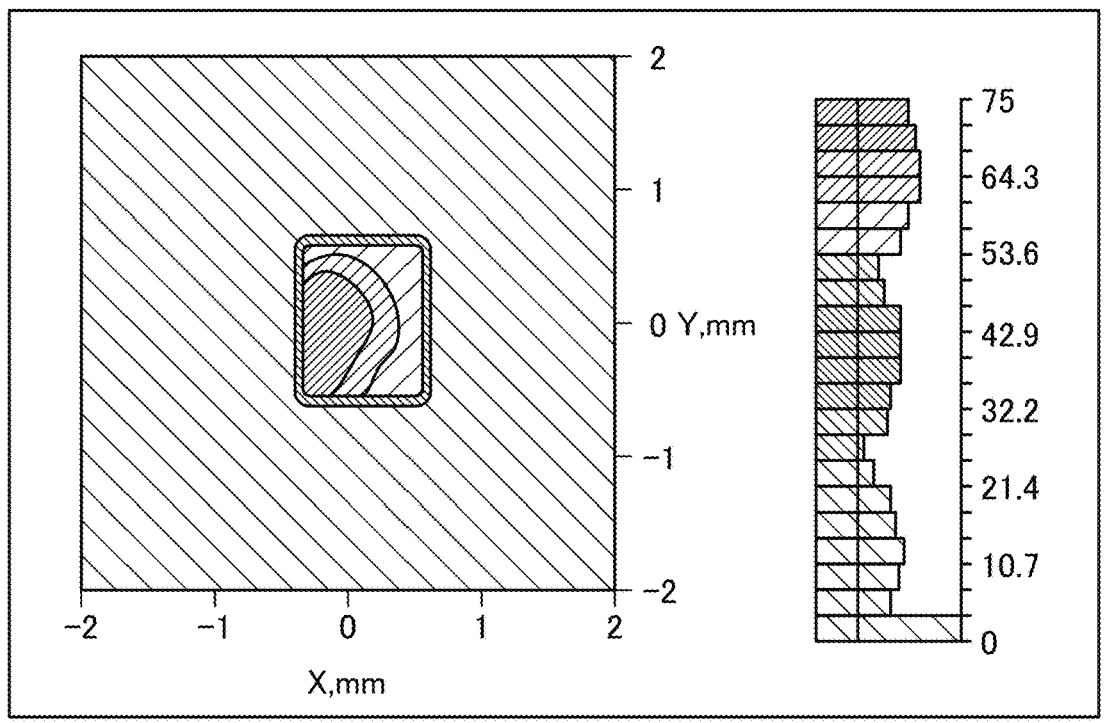
FIG. 32A and FIG. 32B are diagrams each illustrating the light distribution on a wavelength conversion element, which varies depending on the tilt angle of the laser beams incident on an optical element, according to an embodiment of the present disclosure.
Figure 32B:
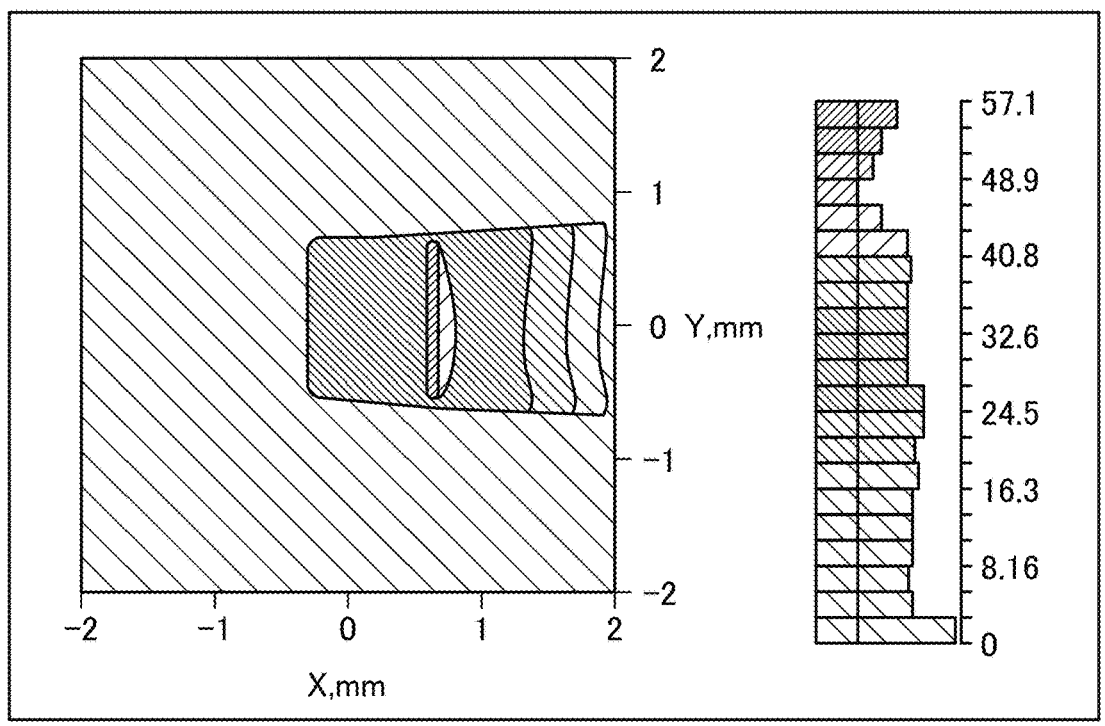

FIG. 32A and FIG. 32B are diagrams each illustrating the light distribution on the wavelength conversion element 26, which varies depending on the tilt angle of the laser beams incident on the optical element 28, according to the present embodiment.

More specifically. FIG. 32A illustrates a case in which the laser beams are incident on the optical element 28 with no inclination, and FIG. 32B illustrates a case in which the laser beams are incident on the optical element 28 with a slight inclination.

As illustrated in FIG. 31, in order to make the light distribution on the wavelength conversion element 26 even as illustrated in FIG. 32A, the optical element 28 uses a lens-array surface with a small lens pitch p2 relative to the width of the light flux incident on the optical element 28. More specifically, such a small lens pitch p2 is equal to or smaller than one-quarter of the width of the light flux. The lens pitch p2 of the lens-array surface of the optical element 28 is equal to or narrower than one-quarter of the width of the light flux in both the X-direction and the Y-direction.

Figure 33:
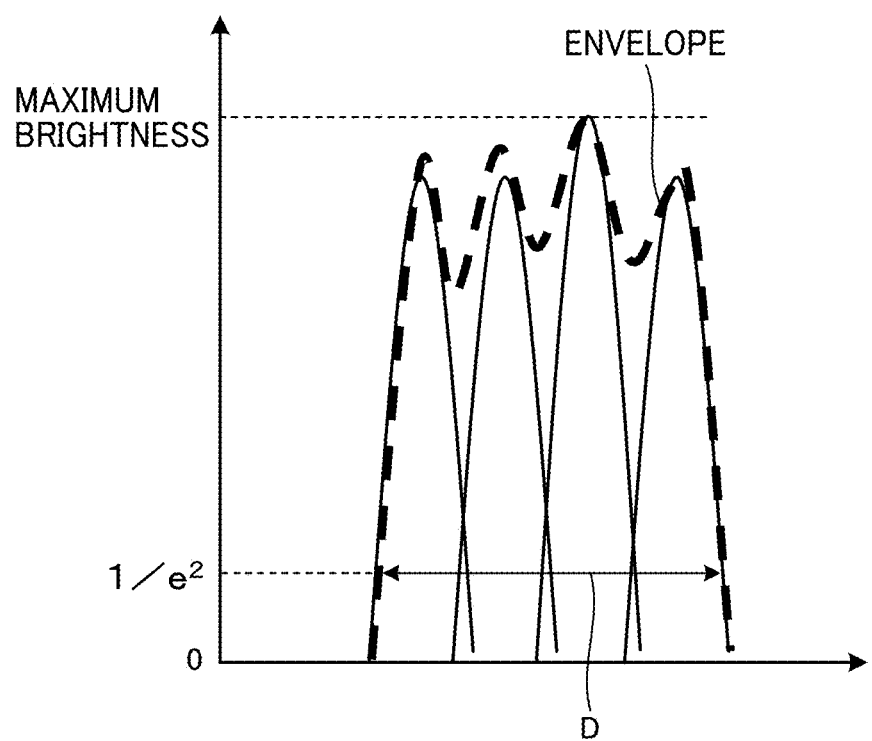
FIG. 33 is a diagram illustrating the cross section of the brightness of a light source image of the entire excitation light incident on an optical element, according to the present embodiment.

FIG. 33 is a diagram illustrating the cross section of the brightness of a light source image of the entire excitation light incident on the optical element 28, according to the present embodiment.

In the present embodiment described with reference to FIG. 33, the arrangement of the excitation light that is emitted from the multiple light sources of the multiple laser beam sources 21 has a discrete distribution. As illustrated in FIG. 33, the light-flux width D of the excitation light incident on the optical element 28 is the width with which $1/e^2$ of the maximum brightness can be obtained in the envelope of the diagram illustrating the cross section of the brightness.

In the conventional optical element as illustrated in FIG. 30, a lens-array surface with a sufficiently wide pitch p1 with respect to the width of the light flux is used. By contrast, the optical element 28 according to the present embodiment uses a lens-array surface with the pitch p2 equal to or narrower than one-quarter of the width of the light flux is used. Due to such a configuration, as illustrated in FIG. 32B, the light spot on the wavelength conversion element 26 tends to be uneven when the laser beams incident on the optical element 28 are slightly inclined.

In order to achieve such functions, in the present embodiment, at least one of the positive lens 23a and the negative lens 23b that make up the first optical system 23 is shifted or tilted. Alternatively, both the positive lens 23a and the negative lens 23b are adjusted by the adjuster. Due to such a configuration, the incident angle that the laser beams form with optical element 28 can be adjusted so as to fall within three degrees. The adjuster performs adjustment by interposing a spacer such as a shim plate near at least one of the positive lens 23a and the negative lens 23b that make up the first optical system 23. However, no limitation is indicated thereby, and a mechanism using, for example, a screw and a spring may also be used. As described above, by integrating the first optical system 23 and the adjuster with each other, a small image projection apparatus can be achieved at a low cost.

In the present embodiment, the term incident angle refers to an angle that the line drawn by the course of the centroid or the center of the light flux forms with the normal to the incident plane when the light flux is incident on the optical element 28. As illustrated in FIG. 32A and FIG. 32B, it is desired that the light distribution on the wavelength conversion element 26 form small and even light spots in view of the light-transforming efficiency. In the present embodiment, it is desired that the incident angle that the laser beams form with the optical element 28 fall within three degrees because the influence and variation of the efficiency are within an allowable range when such a condition is met.

More specifically, when the incident angle that the laser beams form with optical element 28 exceeds three degrees, the radiation intensity of light of the ghost, which is caused as the light enters a neighboring microlens, tends to be equal to or greater than 50%. The radiation intensity of the light of the ghost is not to exceed 50% because human perception is typically on a log scale. As long as the radiation intensity of the light of the light source is sufficient as in the case of a high-luminance light source. 50% in individual variations due to the adjustment does not cause a change recognizable in human perception, and such a change is allowable in terms of standards.

Figure 34A:
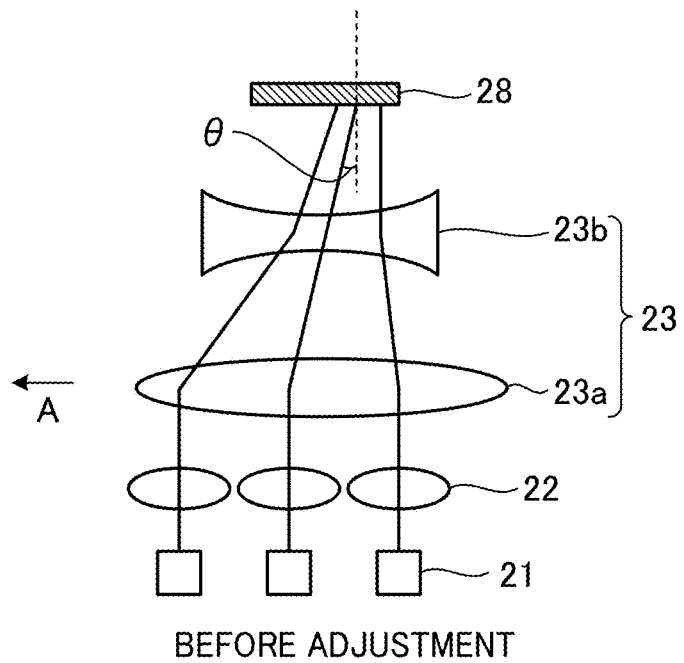
FIG. 34A and FIG. 34B are diagrams each illustrating the adjustment of an incident angle that the light forms with an optical element, according to an embodiment of the present disclosure.
Figure 34B:
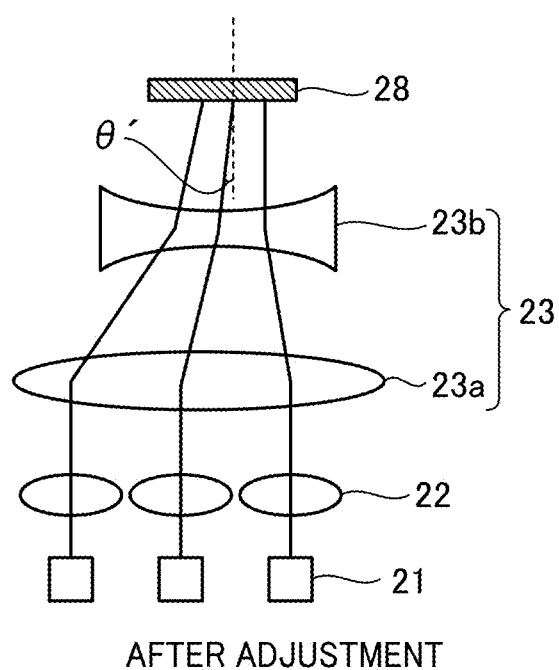

FIG. 34A and FIG. 34B are diagrams each illustrating the adjustment of an incident angle that the light forms with the optical element 28, according to the present embodiment.

In the present embodiment described with reference to FIG. 34A and FIG. 34B, the positive lens 23a that makes up the first optical system 23 is shifted or moved in the direction of an arrow A by an adjuster to adjust the incident angle that the laser beams form with optical element 28 to fall within three degrees.

As described above, according to the above embodiments of the present disclosure, the incident angle that the laser beams form with optical element 28 is adjusted to an appropriate angle to uniformize the light density of the light spot on the wavelength conversion element 26. As the temperature of the wavelength conversion element 26 is prevented from increasing, a reduction in the light-transforming efficiency of the wavelength conversion element 26 can be avoided. Accordingly, an efficient image projection apparatus can be achieved.

Eighth Embodiment

An eighth embodiment of the present disclosure is described below.

The eighth embodiment of the present disclosure is different from the seventh embodiment of the present disclosure in that the reflex optical element that reflects the excitation light is disposed between the first optical system 23 and the optical element 28 and the reflex optical element is shifted or tilted or the transmissive optical element is both shifted and tilted. Note that like reference signs are given to elements similar to those described in the seventh embodiment, and their detailed description is omitted in the description of the eighth embodiment of the present disclosure given below.

Figure 35:
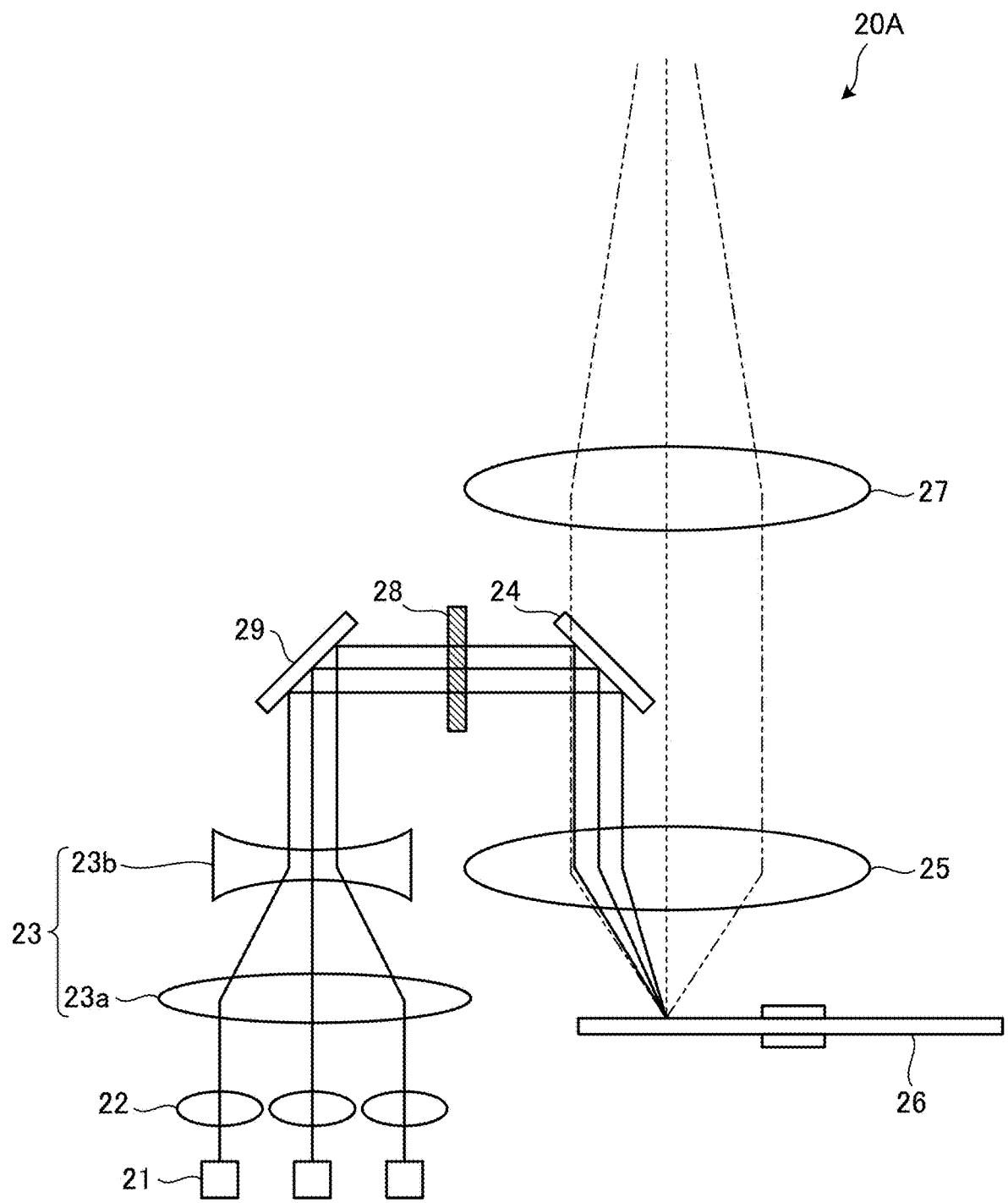
FIG. 35 is a schematic diagram illustrating a configuration or structure of a light source unit according to an eighth embodiment of the present disclosure.

FIG. 35 is a schematic diagram illustrating a configuration or structure of the light source unit 20A according to an eighth embodiment of the present disclosure.

The light source unit 20B has a configuration and structure similar to that of the light source unit 20A.

As illustrated in FIG. 35, in the light source unit 20A according to the present embodiment, the reflex optical element 29 is disposed between the first optical system 23 and the optical element 28. In the present embodiment, a dichroic mirror is used as the reflex optical element 29. Although a dichroic mirror is used as the reflex optical element 29, no limitation is indicated thereby. For example, a mirror, prism, or a diffractive-optical element (DOE) may be used as the reflex optical element 29.

As illustrated in FIG. 35, the excitation light that is emitted from the multiple laser beam sources 21 is approximately collimated by the multiple collimator lenses 22 that correspond to the multiple light sources of the laser beam sources 21. Then, the approximately collimated excitation light is incident on the first optical system 23. The light flux of the excitation light is reduced in size by the first optical system 23, and is guided to the reflex optical element 29. The excitation light turned by the reflex optical element 29 is incident on the optical element 28. The excitation light that has passed through the optical element 28 is guided to the dichroic mirror 24.

Figure 36A:
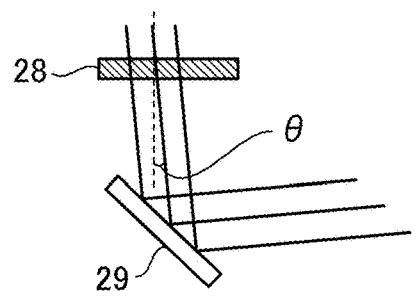
FIG. 36A and FIG. 36B are diagrams each illustrating the adjustment of an incident angle that the light forms with an optical element, using a reflex optical element, according to an embodiment of the present disclosure.
Figure 36B:
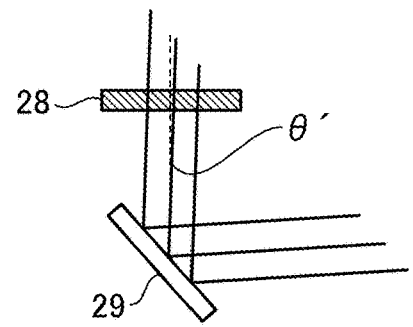

FIG. 36A and FIG. 36B are diagrams each illustrating the adjustment of an incident angle that the light forms with the optical element 28, using the reflex optical element 29, according to the present embodiment.

In the present embodiment described with reference to FIG. 36A and FIG. 36B, the adjuster tilts the reflex optical element 29 by an angle θ to adjust the incident angle that the laser beams form with optical element 28 to fall within three degrees. The adjuster performs adjustment by interposing a spacer such as a shim plate near the reflex optical element 29. However, no limitation is indicated thereby, and a mechanism using, for example, a screw and a spring may also be used. As described above, adopting a configuration in which the reflex optical element 29 is adjusted by the adjuster enables a foldable optical system and a downsized image projection apparatus.

As described above, according to the above embodiments of the present disclosure, the incident angle that the laser beams form with optical element 28 is adjusted to an appropriate angle. By so doing, equalization of the light density of the light spot on the wavelength conversion element 26 is achieved, and the temperature of the wavelength conversion element 26 is prevented from increasing. Due to such a configuration, a reduction in the light-transforming efficiency of the wavelength conversion element 26 can be avoided. Accordingly, an efficient image projection apparatus can be achieved.

Ninth Embodiment

A ninth embodiment of the present disclosure is described below.

The ninth embodiment of the present disclosure is different from the seventh embodiment of the present disclosure in that a transmissive optical element through which the excitation light passes is disposed between the first optical system 23 and the optical element 28 and the transmissive optical element is shifted or tilted or the transmissive optical element is both shifted and tilted. Note that like reference signs are given to elements similar to those described in the seventh embodiment, and their detailed description is omitted in the description of the ninth embodiment of the present disclosure given below.

Figure 37:
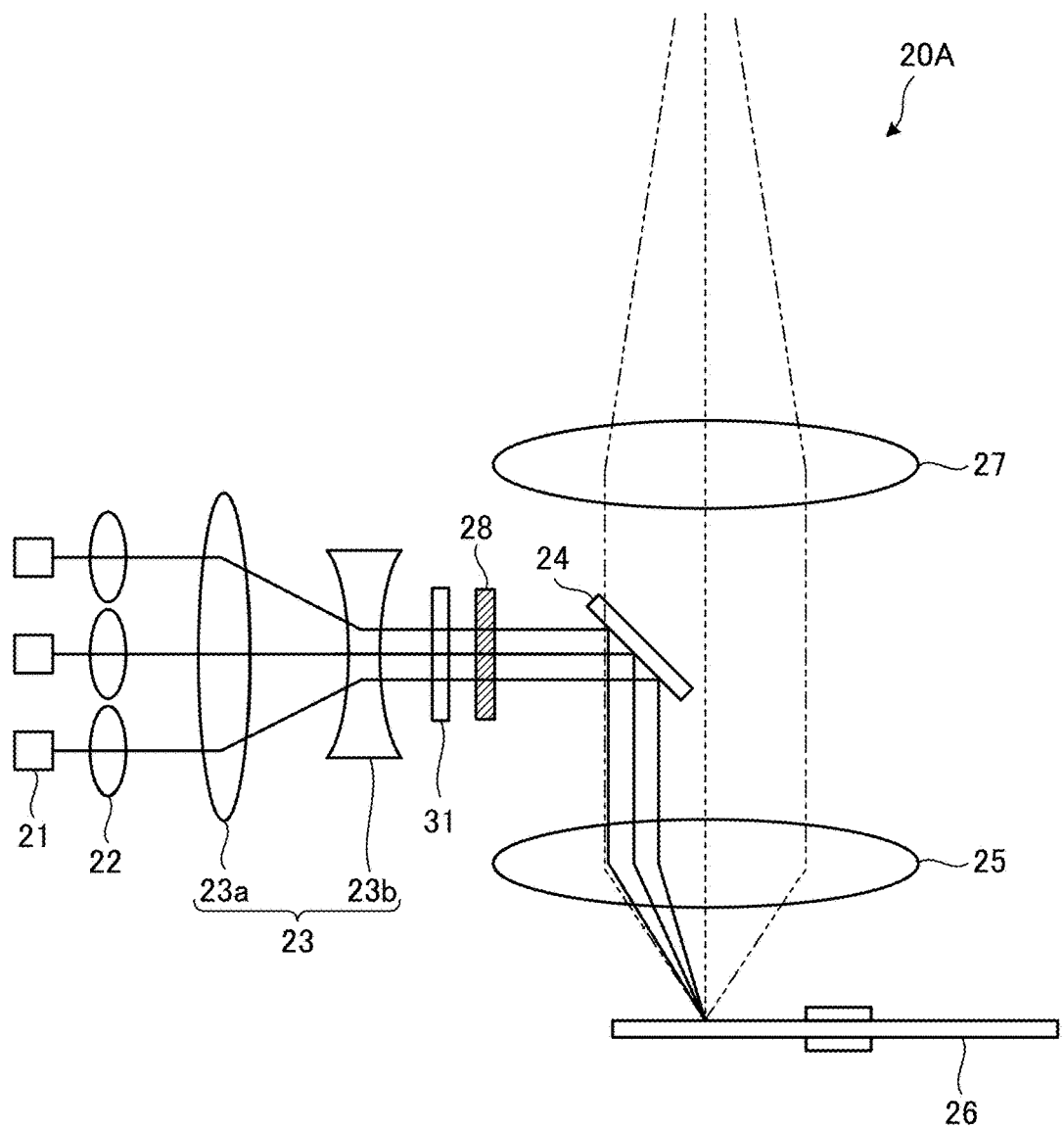
FIG. 37 is a schematic diagram illustrating a configuration or structure of a light source unit according to a ninth embodiment of the present disclosure.

FIG. 37 is a schematic diagram illustrating a configuration or structure of the light source unit 20A according to a ninth embodiment of the present disclosure.

The light source unit 20B has a configuration and structure similar to that of the light source unit 20A.

As illustrated in FIG. 37, in the light source unit 20A according to the present embodiment, the transmissive optical element 31 is disposed between the first optical system 23 and the optical element 28. In the present embodiment, a dichroic mirror is used as the transmissive optical element 31. Although a dichroic mirror is used as the transmissive optical element 31, no limitation is indicated thereby. For example, a diffractive-optical element (DOE) and elements such as a parallel plate and a wedge prism in which the incident plane is not parallel to the exit plane may be used as the transmissive optical element 31.

As illustrated in FIG. 37, the excitation light that is emitted from the multiple laser beam sources 21 is approximately collimated by the multiple collimator lenses 22 that correspond to the multiple light sources of the laser beam sources 21. Then, the approximately collimated excitation light is incident on the first optical system 23. The light flux of the excitation light is reduced in size by the first optical system 23, and is incident on the transmissive optical element 31. The excitation light that has passed through the transmissive optical element 31 passes through the optical element 28, and is guided to the dichroic mirror 24.

Figure 38A:
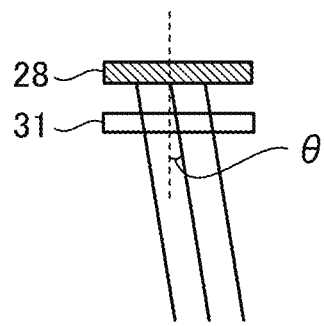
FIG. 38A and FIG. 38B are diagrams each illustrating the adjustment of an incident angle that the light forms with an optical element, using a transmissive optical element, according to an embodiment of the present disclosure.
Figure 38B:
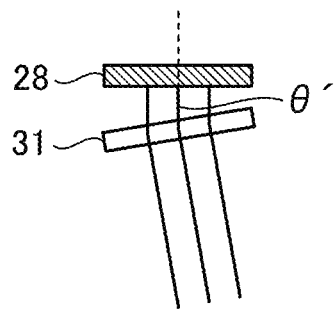

FIG. 38A and FIG. 38B are diagrams each illustrating the adjustment of an incident angle that the light forms with the optical element 28, using the transmissive optical element 31, according to the present embodiment.

In the present embodiment described with reference to FIG. 38A and FIG. 38B, the adjuster tilts the transmissive optical element 31 by an angle θ. By so doing, the incident angle that the laser beams form with optical element 28 can be adjusted so as to fall within three degrees. The adjuster performs adjustment by interposing a spacer such as a shim plate near the transmissive optical element 31. However, no limitation is indicated thereby, and a mechanism using, for example, a screw and a spring may also be used. As described above, adopting a configuration in which the transmissive optical element 31 such as a diffractive-optical element (DOE) is adjusted by the adjuster enables an image projection apparatus at a low cost.

As described above, according to the above embodiments of the present disclosure, the incident angle that the laser beams form with optical element 28 can be made as desired. By so doing, equalization of the light density of the light spot on the wavelength conversion element 26 is achieved, and the temperature of the wavelength conversion element 26 is prevented from increasing. Due to such a configuration, a reduction in the light-transforming efficiency of the wavelength conversion element 26 can be avoided. Accordingly, an efficient image projection apparatus can be achieved.

Tenth Embodiment

A tenth embodiment of the present disclosure is described below.

The tenth embodiment of the present disclosure is different from the first embodiment to the sixth embodiment of the present disclosure in that the projector 1 that serves as the image projection apparatus according to any one of the first embodiment to the ninth embodiment of the present disclosure is applied to the display device 100 with which a user can visually recognize a three-dimensional image. Note that like reference signs are given to elements similar to those described in the first embodiment to the ninth embodiment, and their detailed description is omitted in the following description of the seventh embodiment of the present disclosure.

Figure 39:
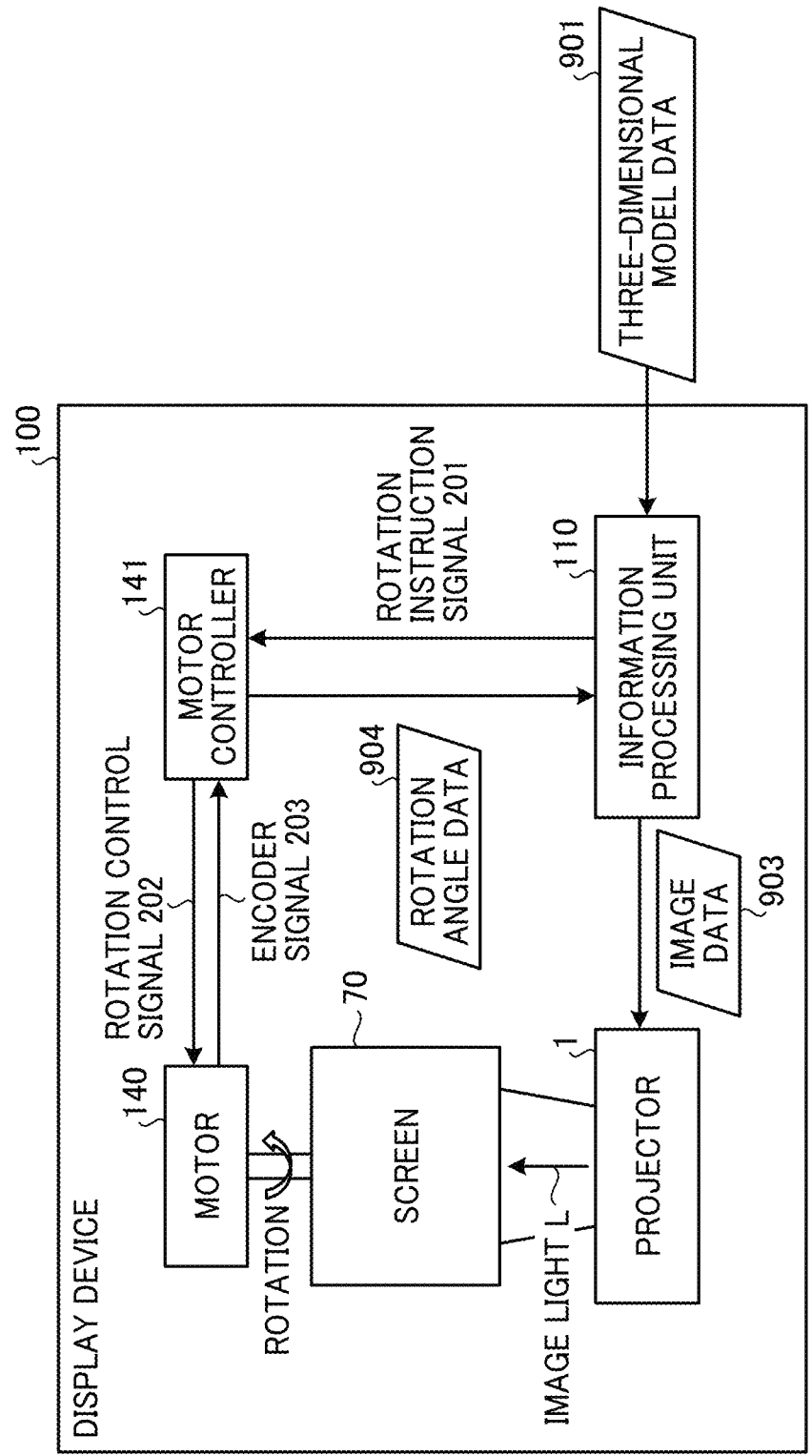
FIG. 39 is a schematic block diagram of a display device according to a tenth embodiment of the present disclosure.

FIG. 39 is a schematic block diagram of the display device 100 according to the tenth embodiment of the present disclosure.

The display device 100 according to the present embodiment may be referred to as a three-dimensional display with which a user can visually recognize a three-dimensional image. In the present embodiment, the term three dimensional image refers to a three dimensional image that is displayed in a three-dimensional space and has a volume that can be visually recognized by a human.

As illustrated in FIG. 39, the display device 100 according to the present embodiment includes an information processing unit 110, the projector 1, a screen 70 that serves as a spiral screen, a motor 140, and a motor controller 141.

The display device 100 according to the present embodiment receives the three-dimensional model data 901, and allows a user of the display device 100 to visually recognize a three-dimensional image. The three-dimensional model data 901 is data indicating a three-dimensional model that allows a user to visually recognize a three-dimensional image, and is, for example, data indicating a pixel value for each three-dimensional voxel. More specifically, the three-dimensional model data 901 is output to the information processing unit 110.

The information processing unit 110 generates the image data 903 based on the input three-dimensional model data 901. More specifically, the information processing unit 110 according to the present embodiment sends a rotation instruction signal 201 to the motor controller 141 to instruct the motor 140 to start rotating. Upon receipt of the instructions, for example, the motor controller 141 sends a rotation control signal 202 to drive the motor 140 such that the screen 70 will rotate at a predetermined substantially constant speed.

The screen 70 according to the present embodiment serves as a to-be-irradiated member that includes helical structure in which a cross section at a plane orthogonal to the screw axis is curved.

The motor 140 according to the present embodiment is a driver that drives the screen 70 to rotate around the screw axis. The motor 140 may be, for example, a stepping motor, a direct-current (DC) motor, and an alternating-current (AC) motor.

The motor 140 according to the present embodiment is provided with a rotary encoder. Such a rotary encoder sends an encoder signal 203 that indicates the rotation angle of the rotation axis of the motor 140 to a motor controller 141. The motor controller 141 according to the present embodiment generates the rotation angle data 904, which indicates the rotation angle of the screen 70, based on the received encoder signal 203, and sends the generated rotation angle data 904 to the information processing unit 110.

The information processing unit 110 according to the present embodiment generates image data 903, which corresponds to the rotation angle of the screen 70, based on the received rotation angle data 904, and sends the generated image data 903 to the projector 1. The image data 903 indicates a two-dimensional image.

The projector 1 according to the present embodiment projects the image light L to the screen 70 that is being rotated. More specifically, the projector 1 can project to the screen 70 the image light L based on the image data 903 output from the information processing unit 110. In other words, the projector 1 can project the image light L generated based on the position of the screen 70 that is being rotated.

The display device 100 according to the present embodiment allows a user to visually recognize a color three-dimensional image using an effect of the persistence of vision, and such an effect of the persistence of vision is achieved by the image light L emitted to and reflected by the screen 70 that is rotated at high speed.

The to-be-irradiated member is not limited to the screen 70 according to the present embodiment, and an element that vibrates the screen may be used as long as it can display an image using an effect of the persistence of vision.

By way of example, modes of the present disclosure are given below.

First Mode

A light-source device comprises: a light source configured to emit light; an optical element having a lens array on one side or both sides of which a plurality of lenses are arrayed; and a wavelength conversion element configured to convert a wavelength of the light emitted from the light source and passed through the optical element, and distance P between a pair of vertices of an adjacent pair of the plurality of lenses of the optical element is equal to or less than one-quarter of width D of the light flux of the light incident on the optical element.

Second Mode

The light-source device according to the first mode of the present disclosure further comprises: a second optical system disposed between the optical element and the wavelength conversion element; and the width D of the light flux is equal to or shorter than one-third of an external diameter $D_{opt}$ of one of a plurality of lenses of the second optical system close to the light source.

Third Mode

The light-source device according to the second mode of the present disclosure comprises: an optical surface that guides the light passed through the optical element to the wavelength conversion element; and a width $D_{mirror}$ of light flux on the optical surface is equal to or shorter than one-third of the external diameter $D_{opt}$ of one of the plurality of lenses of the second optical system close to the light source.

Fourth Mode

In the light-source device according to any one of the first mode to the third mode of the present disclosure, the light source includes a plurality of light-emitting points, and the distance P is equal to or less than one-half of a width ($D_{single}$) of light flux of light that is emitted from one of the plurality of light-emitting points and is incident on the optical element.

Fifth Mode

In the light-source device according to any one of the first mode to the fourth mode of the present disclosure, the optical element includes a lens array in which a plurality of rectangular spherical lenses are arrayed.

Sixth Mode

In the light-source device according to the third mode of the present disclosure, the optical surface is a dichroic mirror.

Seventh Mode

The light-source device according to the third mode of the present disclosure further comprises a first optical system having at least a lens with positive optical power and a lens with negative optical power between the light source and the optical surface.

Eighth Mode

In the light-source device according to the seventh mode of the present disclosure, the lens with the negative optical power has an external diameter equal to or less than one-half of the external diameter $D_{opt}$ of the one of the plurality lenses of the second optical system close to the light source.

Ninth Mode

An image projection apparatus comprises: the light-source device according to any one of the first mode to the eighth mode of the present disclosure: a light mixing element configured to mix the light emitted from the light-source device to uniformize the light; an illumination optical system configured to emit the light uniformized by the light mixing element; an image forming element configured to modulate the light emitted from the illumination optical system to form an image of image light; and a projection optical system configured to project the image light formed by the image forming element to a to-be-irradiated member.

Tenth Mode

In the image projection apparatus according to the ninth mode of the present disclosure, each one of the plurality of lenses of the optical element has a rectangular shape, and the rectangular shape of the optical element has a side approximately parallel to an entrance side of the light mixing element.

Eleventh Mode

A display device comprises: the image projection apparatus according to the ninth mode or the tenth mode of the present disclosure; and a to-be-irradiated member irradiated with the image light from the image projection apparatus, and the to-be-irradiated member irradiated with the image light is rotated or vibrated to display a three-dimensional image.

By way of example, modes of the present disclosure are given below.

First Mode

A light-source device comprises: a light source configured to emit light; a light-shaping element having a lens-array surface in which a plurality of lenses are arranged in an array; and a wavelength conversion element configured to convert a wavelength of the light emitted from the light source and passed through the light-shaping element. In the light-source device according to the first mode of the present disclosure, an adjacent pair of the plurality of lenses on the lens-array surface are arranged at a pitch equal to or shorter than one-quarter of a width of light flux of the light incident on the light-shaping element, and an incident angle that the light form with the light-shaping element is within three degrees.

Second Mode

In the light-source device according to the first mode of the present disclosure, the light-shaping element includes at least two lens-array surfaces.

Third Mode

In the light-source device according to the first mode of the present disclosure, the light-shaping element has a lens-array surface on either one of the plane on which the light that is incident or the plane from which the light exits.

Fourth Mode

The light-source device according to any one of the first mode to the third mode of the present disclosure further comprises: a first optical system disposed between the light source and the light-shaping element, the first optical system being configured to shrink light flux of the light emitted from the light source; and an adjuster configured to shift or tilt the first optical system to adjust an incident angle of light flux incident on the light-shaping element.

Fifth Mode

The light-source device according to any one of the first mode to the third mode of the present disclosure further comprises: a reflex optical element disposed between the light source and the light-shaping element, the reflex optical element being configured to reflect the light emitted from the light source and guide the light to the light-shaping element; and an adjuster configured to shift or tilt the reflective optical element to adjust an incident angle of a light beam to the light-shaping element.

Sixth Mode

The light-source device according to any one of the first mode to the third mode of the present disclosure further comprises: a transmissive optical element through which the light emitted from the light source passes, the transmissive optical element being disposed between the light source and the light-shaping element; and an adjuster configured to shift or tilt the transmissive optical element to adjust an incident angle of a light beam to the light-shaping element.

Seventh Mode

In the light-source device according to any one of the fourth mode to the sixth mode of the present disclosure, the adjuster is a spacer.

Eighth Mode

An image projection apparatus comprises: the light-source device according to any one of the first mode to the seventh mode of the present disclosure: a light mixing element configured to mix the light emitted from the light-source device to uniformize the light; an illumination optical system configured to emit the light uniformized by the light mixing element: an image forming element configured to modulate the light emitted from the illumination optical system to form an image of image light; and a projection optical system configured to project the image light formed by the image forming element to a to-be-irradiated member.

Ninth Mode

A display device comprises: the image projection apparatus according to the eighth mode of the present disclosure; and a to-be-irradiated member irradiated with the image light from the image projection apparatus, and the to-be-irradiated member irradiated with the image light is rotated or vibrated to display a three-dimensional image.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A light-source device, comprising:
   a light source to emit light;
   an optical element having a lens array on one side or both sides of which a plurality of lenses are arrayed with distance from each other, the distance between a pair of vertices of an adjacent pair of the plurality of lenses of the optical element being equal to or less than one-quarter of width of light flux of the light incident on the optical element;
   a wavelength conversion element to convert a wavelength of the light emitted from the light source and passed through the optical element; and
   a second optical system disposed between the optical element and the wavelength conversion element, the second optical system including a pair of lenses,
   wherein the width of the light flux is equal to or shorter than one-third of an external diameter of one of the pair of lenses closer to the light source than another one of the pair of lenses of the second optical system.

2. The light-source device according to claim 1, further comprising:
   an optical surface that guides the light passed through the optical element to the wavelength conversion element, and
   wherein a width of light flux on the optical surface is equal to or shorter than one-third of the external diameter of the one of the pair of lenses closer to the light source to the light source than the another one of the pair of lenses of the second optical system.

3. The light-source device according to claim 2, wherein: the optical surface is a dichroic mirror.

4. The light-source device according to claim 3, further comprising:
   a first optical system being disposed between the light source and the optical surface, the first optical system having at least a lens with positive optical power and a lens with negative optical power.

5. The light-source device according to claim 4, wherein: the lens with the negative optical power has an external diameter equal to or less than one-half of the external diameter of the one of the pair of lenses closer to the light source than the another one of the pair of lenses of the second optical system.

6. The light-source device according to claim 1, wherein: the optical element includes a lens array in which a plurality of rectangular spherical lenses are arrayed.

7. The light-source device according to claim 1, wherein: the light has an incident angle with the optical element, and
   the incident angle is within three degrees.

8. The light-source device according to claim 7, wherein: the optical element has at least two lens-array surfaces.

9. The light-source device according to claim 7, wherein: the optical element has a lens-array surface on either one of a plane on which the light is incident or a plane from which the light exits.

10. The light-source device according to claim 7, further comprising:
    a first optical system disposed between the light source and the optical element, the first optical system to shrink light flux of the light emitted from the light source; and
    an adjuster to shift or tilt the first optical system to adjust an incident angle of light flux incident on the optical element.

11. The light-source device according to claim 10, wherein:
    the adjuster is a spacer.

12. The light-source device according to claim 7, further comprising:
    a reflex optical element disposed between the light source and the optical element, the reflex optical element to reflect the light emitted from the light source and guide the light to the optical element; and an adjuster to shift or tilt the reflex optical element to adjust an incident angle of a light beam to the optical element.

13. The light-source device according to claim 7, further comprising:

a transmissive optical element through which the light emitted from the light source passes, the transmissive optical element being disposed between the light source and the optical element; and an adjuster to shift or tilt the transmissive optical element to adjust an incident angle of a light beam to the optical element.

14. An image projection apparatus, comprising:

the light-source device according to claim 1;

a light mixing element to mix the light emitted from the light-source device to uniformize the light;

an illumination optical system to emit the light uniformized by the light mixing element;

an image forming element to modulate the light emitted from the illumination optical system to form an image of image light; and a projection optical system to project the image light formed by the image forming element to a to-be-irradiated structure.

15. The image projection apparatus according to claim 14, wherein:

each one of the plurality of lenses of the optical element has a rectangular shape, and the rectangular shape of the optical element has a side approximately parallel to an entrance side of the light mixing element.

16. A display device, comprising:

an image projection apparatus including the light-source device according to claim 1;

a light mixing element to mix the light emitted from the light-source device to uniformize the light;

an illumination optical system to emit the light uniformized by the light mixing element;

an image forming element to modulate the light emitted from the illumination optical system to form an image of image light; and a projection optical system to project the image light formed by the image forming element to a to-be-irradiated structure; and a to-be-irradiated structure irradiated with the image light from the image projection apparatus, the to-be-irradiated structure being rotated or vibrated to display a three-dimensional image.

17. A light-source device, comprising:

a light source to emit light;

an optical element having a lens array on one side or both sides of which a plurality of lenses are arrayed with distance from each other, the distance between a pair of vertices of an adjacent pair of the plurality of lenses of the optical element being equal to or less than one-quarter of width of light flux of the light incident on the optical element; and a wavelength conversion element to convert a wavelength of the light emitted from the light source and passed through the optical element, wherein the light source includes a plurality of light-emitting points, and wherein the distance is equal to or less than one-half of a width of light flux of light that is emitted from one of the plurality of light-emitting points and is incident on the optical element.

18. An image projection apparatus comprises:

the light-source device according to claim 17;

a light mixing element to mix the light emitted from the light-source device to uniformize the light;

an illumination optical system to emit the light uniformized by the light mixing element;

an image forming element to modulate the light emitted from the illumination optical system to form an image of image light; and a projection optical system to project the image light formed by the image forming element to a to-be-irradiated structure.

19. A display device comprises:

an image projection apparatus including the light-source device according to claim 17;

a light mixing element to mix the light emitted from the light-source device to uniformize the light;

an illumination optical system to emit the light uniformized by the light mixing element;

an image forming element to modulate the light emitted from the illumination optical system to form an image of image light; and a projection optical system to project the image light formed by the image forming element to a to-be-irradiated structure; and a to-be-irradiated structure irradiated with the image light from the image projection apparatus, the to-be-irradiated structure being rotated or vibrated to display a three-dimensional image.

\* \* \* \* \*